(12) United States Patent
Lin et al.

(10) Patent No.: US 12,520,196 B2
(45) Date of Patent: Jan. 6, 2026

(54) CHIP, DEVICE, AND METHOD FOR ADJUSTING DATA TRANSMISSION POLICY BASED ON SERVICE TYPE

(71) Applicant: Huawei Technologies Co., Ltd., Shenzhen (CN)

(72) Inventors: Lixin Lin, Shanghai (CN); Feng Qian, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 17/912,803

(22) PCT Filed: Mar. 18, 2021

(86) PCT No.: PCT/CN2021/081412
§ 371 (c)(1),
(2) Date: Sep. 19, 2022

(87) PCT Pub. No.: WO2021/185300
PCT Pub. Date: Sep. 23, 2021

(65) Prior Publication Data
US 2023/0164630 A1 May 25, 2023

(30) Foreign Application Priority Data
Mar. 20, 2020 (CN) .......................... 202010203555.1

(51) Int. Cl.
*H04W 28/08* (2023.01)
(52) U.S. Cl.
CPC ............................... *H04W 28/0992* (2020.05)

(58) Field of Classification Search
CPC .................................................. H04W 28/0992
See application file for complete search history.

(56) References Cited

U.S. PATENT DOCUMENTS

2018/0367288 A1  12/2018  Vrzic et al.
2019/0132629 A1*  5/2019  Kendrick ........... H04N 21/4532
(Continued)

FOREIGN PATENT DOCUMENTS

CN    103312441 A      9/2013
CN    108631962 A  *  10/2018  ........... H04L 1/1848
(Continued)

OTHER PUBLICATIONS

3GPP TS 38.323 V15.6.0 (Jun. 2019), 3rd Generation Partnership Project; Technical Specification Group Radio Access Network; NR; Packet Data Convergence Protocol (PDCP) specification (Release 15) 26 pages.

*Primary Examiner* — Kevin C. Harper
(74) *Attorney, Agent, or Firm* — Slater Matsil, LLP

(57) ABSTRACT

The present invention provides an electronic device, a method, and a chip for sending data. The method includes: When a terminal device is in a dual-connectivity state, the terminal device determines a foreground application that is currently being run. When the application that is being run in a foreground is a present application, the terminal device further determines whether that is being of to-be-sent data is a data packet of a present type or a hardware resource occupation status of the terminal device; and sends the data packet of the present type, respectively sends the two data packets through two links, to implement transmission accuracy of sensitive data.

17 Claims, 16 Drawing Sheets

(56) References Cited

U.S. PATENT DOCUMENTS

| | | |
|---|---|---|
| 2019/0253915 A1 | 8/2019 | Joseph et al. |
| 2020/0045762 A1 | 2/2020 | Raghuram et al. |
| 2021/0044529 A1* | 2/2021 | Salem .................... H04L 47/24 |
| 2021/0168887 A1* | 6/2021 | Zhang ................... H04W 76/11 |

FOREIGN PATENT DOCUMENTS

| | | | |
|---|---|---|---|
| CN | 109257771 A | 1/2019 | |
| CN | 109600853 A | 4/2019 | |
| CN | 110149730 A | 8/2019 | |
| CN | 110225553 A | 9/2019 | |
| CN | 110505675 A * | 11/2019 | ............ H04W 48/18 |
| WO | 2019019182 A1 | 1/2019 | |
| WO | 2019157728 A1 | 8/2019 | |

\* cited by examiner

CHIP, DEVICE, AND METHOD FOR ADJUSTING DATA TRANSMISSION POLICY BASED ON SERVICE TYPE

CROSS-REFERENCE TO RELATED APPLICATIONS

This application is a national stage of International Application No. PCT/CN2021/081412, filed on Mar. 18, 2021, which claims priority to Chinese Patent Application No. 202010203555.1, filed on Mar. 20, 2020, which is hereby incorporated by reference in its entirety.

TECHNICAL FIELD

Embodiments of this application relate to the communication field, and in particular, to a data transmission method in dual connectivity (Dual Connectivity, DC for short below).

BACKGROUND

DC is an intermediate technology used during evolution from 4G to 5G, and is mainly for deploying a 5G network step by step. During evolution from a 4G network to the 5G network, a gNB is added on a basis of an eNB in a 4G access network, to enable a user to experience 5G network access more quickly. It is stipulated in a 5G protocol that the user may use both the eNB and the gNB to access an ENDC network. To implement better network access experience, a network access split technology needs to be researched.

Existing split standard technologies are all TCP/IP split technologies that are based on protocols such as MPTCP, MPUDP, and MPHTTP, and there is no related research on a same-type network split of a modem. TCP/IP split control strictly depends on a feedback of an application server. This often requires waiting for a long delay. In addition, it is clear that implementing a split completely depending on deployment of the server is not a solution that covers a plurality of scenarios.

SUMMARY

For the foregoing reasons, this application of the present invention provides a data transmission method, device, and chip, to help reduce power consumption and enable a user to have better data transmission experience.

According to an aspect, an embodiment of this application provides a method, including: A terminal device connects to a 4G network device through an LTE link, and the terminal device connects to a 5G network device through an NR link. The terminal device runs a first application in response to a first operation of a user. When the first application is a preset application, and a first data packet sent by the terminal device is a preset data packet, the terminal device respectively sends the first data packet and a second data packet through the LTE link and the NR link, where the second data packet is duplicated from the first data packet. Transmission accuracy of sensitive data can be implemented.

In some possible implementations, the terminal device runs a second application in response to a second operation of the user. The terminal sends a third data packet through the NR link, where the second application is a non-preset application, or the third data packet is a data packet of a non-preset type.

Delay-insensitive data does not need to be duplicated, to reduce power consumption.

In some possible implementations, a type of the first data packet includes at least one of the following: a game data packet, a voice data packet, a DNS data packet, a video data packet, and a UDP data packet.

In some possible implementations, the terminal device has a first split threshold, and the threshold is infinite.

In some possible implementations, the terminal device determines, by monitoring an application name or an activity name, that the first application that is currently being run is the preset application.

According to a second aspect, an embodiment of this application provides a terminal device. The terminal device includes a processor and a computer storage medium. The computer storage medium includes instructions. When the processor executes the instructions, the terminal device is enabled to perform the foregoing method.

According to a third aspect, an embodiment of this application provides a chip system, used in a terminal device. The chip system includes an application processor and a baseband processor. The application processor is configured to: run, by the terminal device, a first application in response to a first operation of a user; send a first instruction to the baseband processor when the first application is a preset application, where the first instruction is for enabling a first transmission policy to transmit an uplink data packet; and send a first data packet.

The baseband processor is configured to: receive the instruction, and enable the first transmission policy; and receive the first data packet, and respectively send the first data packet and a second data packet through a first link and a second link when the first data packet is a data packet of a preset type, where the second data packet is duplicated from the first data packet. Transmission accuracy of sensitive data can be implemented.

In some possible implementations, the application processor is further configured to send a third data packet. The baseband processor is further configured to receive the third data packet, and send the third data packet through the first link when third data is data of a non-preset type. Delay-insensitive data does not need to be duplicated, to reduce power consumption.

In some possible implementations, a type of the first data packet includes at least one of the following: a game data packet, a voice data packet, a DNS data packet, a video data packet, and a UDP data packet.

According to a fourth aspect, an embodiment of this application further provides a downlink data transmission method. The method includes: A terminal device connects to a 4G network device through an LTE link, and the terminal device connects to a 5G network device through an NR link. The terminal device runs a first application in response to a first operation of a user. When the first application is a preset application, an application processor of the terminal device sends an instruction to instruct a baseband processor to enable a downlink out-of-order policy, receive a first data packet from a base station, and send the first data packet to the first application when the first data packet is a data packet of a preset type, or send the first data packet to a data buffer when the first data packet is a data packet of a non-preset type. Transmission accuracy of sensitive data can be implemented.

According to a fifth aspect, an embodiment of this application further provides a chip system for downlink data transmission. The chip system is used in a terminal device. The chip system includes an application processor and a baseband processor. The baseband processor and the application processor perform the foregoing method.

According to a sixth aspect, an embodiment of this application further provides a computer program product for downlink data transmission. When the computer program product runs on a computer, the computer is enabled to perform the method according to any one of claims 1 to 6.

According to a seventh aspect, an embodiment of this application further provides a computer storage medium, including computer instructions. When the computer instructions are run on an electronic device, the electronic device is enabled to perform the method according to any one of claims 1 to 6.

According to an eighth aspect, an embodiment of this application provides a method, including: A terminal device connects to a 4G network device through an LTE link, and the terminal device connects to a 5G network device through an NR link. The terminal device runs a first application in response to a first operation of a user. When the first application is a preset application, and a first data packet sent by the terminal device is a preset data packet, the terminal device sends the first data packet through the LTE link, where the LTE link has a high priority relative to the NR link.

In some possible implementations, a delay of the LTE link is less than that of the NR link.

In some possible implementations, when a second data packet sent by the terminal device is a non-preset data packet, the terminal device sends the second data packet through the NR link, where the NR link is a link that is set by default.

In some possible implementations, when a delay of the NR link is less than that of the LTE link, and the first data packet is the preset data packet, the terminal device sends the first data packet through the NR link.

Based on the methods, the device, the chips, the storage medium, and the computer storage product, timeliness and accuracy of data transmission in dual connectivity can be implemented.

DETAILED DESCRIPTION OF ILLUSTRATIVE EMBODIMENTS

In a wireless system, when coordinated networking is performed on base stations or access points of different standards, a same standard, and different systems, because a bandwidth resource and coverage of a single base station are limited, radio resources of a plurality of cells or base stations are centralized to provide a service for a user. This satisfies a capacity requirement and a coverage requirement of the user more easily. Usually, this manner is referred to as multi-connectivity.

An LTE system is used as an example. Common multi-connectivity manners include carrier aggregation, CoMP (Coordinated Multipoint transmission/reception), dual connectivity, and the like. Specifically, the dual connectivity (Dual Connectivity, DC for short below) refers to an operation mode of UE (a terminal device) in an RRC (Radio Resource Control Layer, radio link control layer) connected state. A master cell group (Master Cell Group) and a secondary cell group (Secondary Cell Group) are configured for the UE (the terminal device). This provides a performance solution under a non-ideal transmission condition between the base stations. In this manner, to avoid a delay and a synchronization requirement in a scheduling process at a MAC (Media Access Control, media access control) layer, data is split and merged at a PDCP (Packet Data Convergence Protocol, packet data convergence) layer, and then a user data flow is transmitted to the user through a plurality of base stations simultaneously. This helps to improve user performance, and is helpful to an overall throughput and handover delay of the user. When the dual connectivity is used in the LTE system, after the data is split in a core network or at the PDCP layer, the user data flow is transmitted to the user through the plurality of base stations simultaneously. There are a plurality of choices for the core network and a wireless network. In addition, when the dual connectivity is used, data bearer and the like need to be considered.

Figure 1:
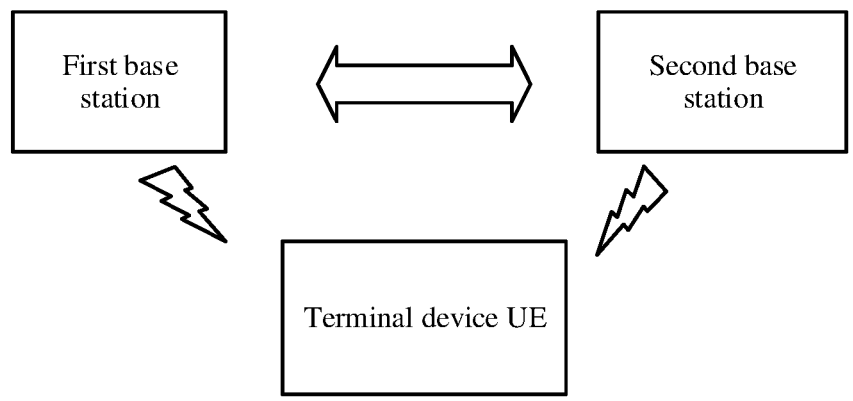
FIG. 1 is a first schematic diagram of a structure according to an embodiment of this application.

It should be noted that dual connectivity between 4G LTE (Long Term Evolution, long term evolution) and 5G NR (New Radio, 5G access network) is used as an example in this application. However, connectivity is not limited to the dual connectivity between LTE and 5G. In a possible implementation, the connectivity may alternatively be between a plurality of different communication standards, for example, between 4G and 5G. As shown in FIG. 1, a first base station may be an LTE eNB, and a second base station may be a gNB. In a possible implementation, the connectivity may alternatively be between base stations of different types in a same generation of communication technology, for example, between an LTE base station and an enhanced LTE base station (eNB). In a possible design, the connectivity may alternatively be between different access points or systems, for example, between an LTE access point and an access point such as Wi-Fi or Bluetooth. In a possible design, this application may alternatively be extended to a multi-connectivity technology, for example, connectivity between a plurality of base stations of different standards or connectivity to a system obtained by combining different systems such a base station and Wi-Fi.

An existing 5G standard defines a plurality of networking manners, including standalone (Standalone, SA for short) and non-standalone (Non-standalone, NSA for short). The non-standalone networking manner is used as an example, and includes a plurality of possible manners such as option 3/3a/3x, option 4/4a, and option 7/7a/7x. Option 3/3a/3x is used as an example. When a 4G eNB (eNB) is a primary base station, a 5G gNB (gNB) is a secondary base station, and an LTE core network is still used, no new 5G core network is required, and all control plane signaling is forwarded by the eNB. There are three corresponding manners of data flow transmission: The eNB may split data to the gNB, an EPC (Evolved Packet Core, which is the LTE core network) splits data to the gNB, or the gNB may split data to the eNB. In this scenario, the eNB is the primary base station, and all the control plane signaling is forwarded by the eNB. The LTE eNB and the NR (New Radio) gNB provide a high data rate service for the user through dual connectivity.

Option 4/4a is used as an example. Both an NGC (Next Generation Core) and a gNB are introduced in option 4. However, the gNB does not directly replace an eNB. In this scenario, a 5G NGC is used for a core network, and both the eNB and the gNB are connected to the NGC. All control plane signaling is forwarded by the gNB. There are two corresponding manners of data flow transmission: The gNB splits data to the eNB, or the NGC splits the data to the eNB.

The foregoing provides only examples of several common typical DC connection manners. This is not limited in this application.

It should be noted that DC in a 4G-5G standard indicates that the UE maintains dual connectivity to both the 4G eNB and the 5G gNB, and radio resources of both the base stations are for performing service transmission. The primary base station bears a control plane, and the primary base station and the secondary base station may bear data. Based on distribution of the data on the primary base station and the secondary base station, there may be the following four DC bearer types:
  a. an MCG bearer (the data is only on the primary base station);
  b. an SCG bearer (the data is only on the secondary base station);
  c. an MCG split bearer (the data is split on the primary base station); and
  d. an SCG split bearer (the data is split on the secondary base station).

Figure 2:
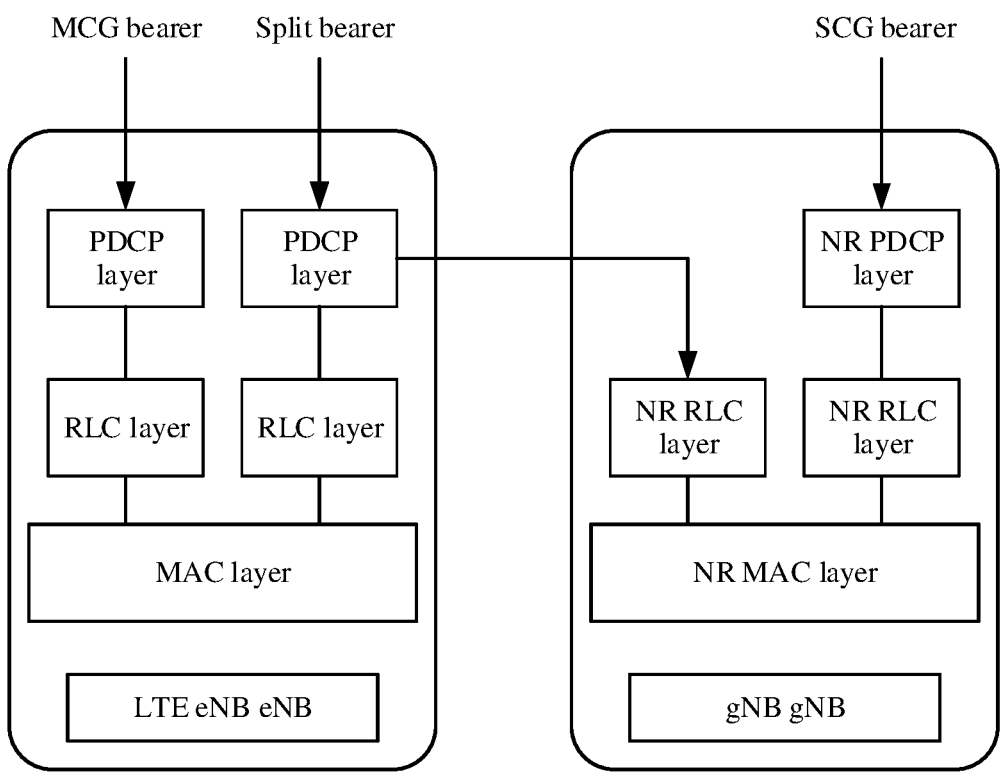
FIG. 2 is a second schematic diagram of a structure according to an embodiment of this application.

FIG. 2 is a first schematic diagram of a data split according to a possible implementation of this application.

As shown in FIG. 2, in dual connectivity, downlink data transmission is used as an example. A data flow is split and merged at a PDCP (Packet Data Convergence Protocol, packet data convergence) layer, and then the data flow is transmitted to a terminal device through a plurality of base stations simultaneously. In this case, one PDCP entity may be associated with two RLC (Radio Link Control, radio link layer control protocol) entities, and this may be understood as follows: The PDCP layer transmits the data flow to an RLC layer by using an RLC link 1 and an RLC link 2. Specifically, the RLC link 1 may be understood as an LTE link, the RLC link 2 may be understood as an NR link, and either RLC entity separately corresponds to an LTE air interface and an NR air interface. In this scenario, a PDCP packet is separately sent over the LTE air interface and the NR air interface based on obtained authorization. This manner may be referred to as an MCG split bearer mode.

Similarly, if the PDCP layer is associated with only one RLC entity, data at the PDCP layer is directly transmitted to an RLC layer. This manner is referred to as an MCG bearer (where the data is transmitted only on a primary base station).

Similarly, if data is transmitted at an NR PDCP layer in this case, that is, the data is transmitted on a secondary base station, only one NR RLC entity is associated. To be specific, the data at the NR PDCP layer is directly transmitted to an NR RLC layer. This manner is referred to as an SCG bearer (where the data is transmitted only on the secondary base station).

In some embodiments, each RLC entity may correspond to at least one bearer link. In some embodiments, there may alternatively be a plurality of RLC entities at the RLC layer.

Figure 3:
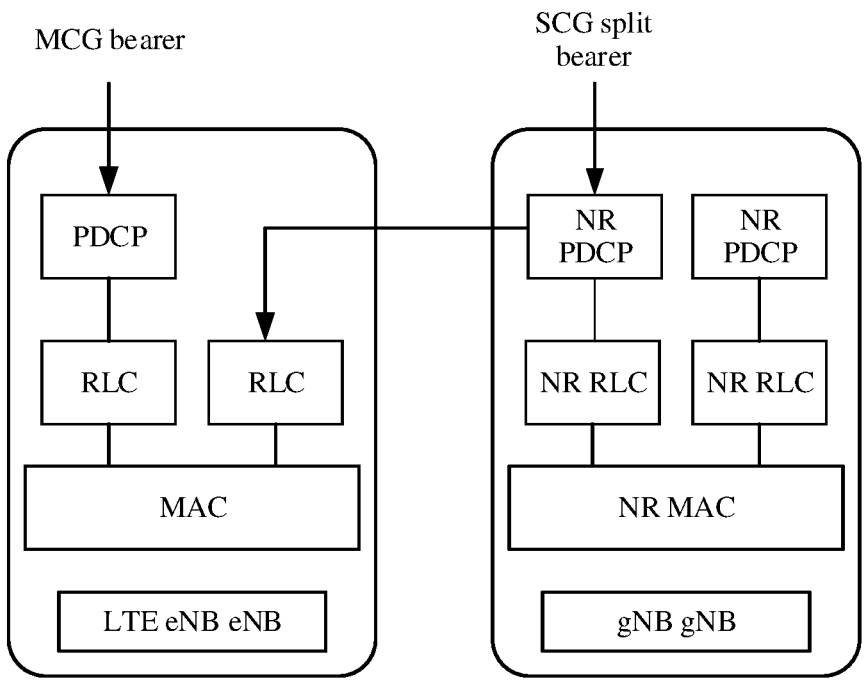
FIG. 3 is a third schematic diagram of a structure according to an embodiment of this application.

FIG. 3 is a second schematic diagram of a data split according to a possible implementation of this application.

As shown in FIG. 3, an LTE eNB is a primary base station, and a gNB is a secondary base station. Data is converged at an NR PDCP layer. One NR PDCP entity may be associated with two RLC (Radio Link Control, radio link layer control protocol) entities, and the two RLC entities correspond to an NR RLC layer and an RLC layer. In this case, data is split on a secondary bearer. This manner is referred to as an SCG split bearer (where the data is split on a secondary base station).

In this case, to avoid a processing capability bottleneck of a 4G eNB, minimize upgrade of the original 4G eNB, and minimize costs of device research and development and network construction, it is stipulated in LTE-NR dual connectivity that the SCG split bearer may alternatively be for transmitting a downlink data flow from a 5G secondary base station to a 4G primary base station, and then to a mobile phone.

Figure 4:
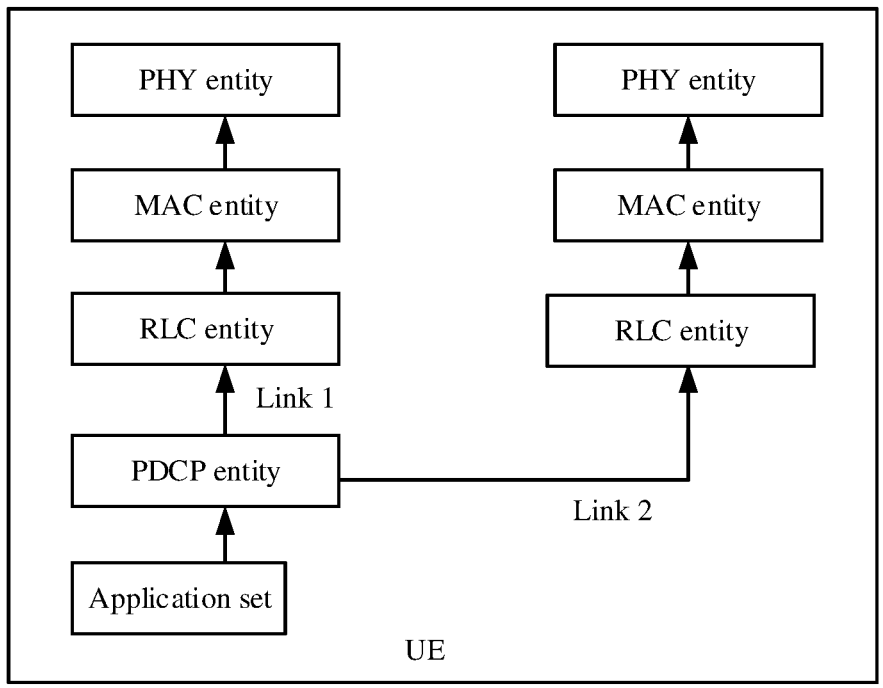
FIG. 4 is a fourth schematic diagram of a structure according to an embodiment of this application.

FIG. 4 is a third schematic diagram of a data split according to a possible implementation of this application.

As shown in FIG. 4, during uplink data transmission, after data flows are converged at a PDCP, split transmission may be performed according to a predefined policy. In some embodiments, the data flows may be evenly allocated to two links. In some embodiments, the data flow may be transmitted to the two links based on link quality. In some embodiments, if a value of a data flow transmitted at the PDCP is less than a threshold of the split transmission, transmission is performed on a primary bearer, for example, a link 1 shown in FIG. 4.

It should be noted that the link 1 and a link 2 in the figure are for ease of description, and are not intended to limit this application.

In some implementations, there may be a plurality of entities at one layer. For example, there may be two RLC entities at RLC, and the two RLC entities correspond to two bearer links. This is not limited in this application.

UE (user equipment) in this application may be an electronic device of any application-oriented type for a consumer to use. An example of the user equipment includes but is not limited to a smartphone, a tablet computer, a television, a projector, a smart watch, smart glasses (for example, Google glass), a wearable accessory (for example, a smart wristwatch, a T-shirt, a necklace, or shoes), a media (for example, music and/or video) player, a game console, a game console and controller, an electronic book (ebook) reader, a cloud terminal, or an in-vehicle media system. The user equipment may be a wearable device (for example, the smart watch or the smart glasses) or a non-wearable device (for example, the television or the tablet computer). In addition, the user equipment may have any suitable operating system (OS), for example, Android, iOS, Windows, Linux, or Unix.

Further, the user equipment may support a plurality of mobile communication technologies of different standards, including 2G/3G/4G/5G, and may further support Wi-Fi, Bluetooth, and the like.

Figure 5:
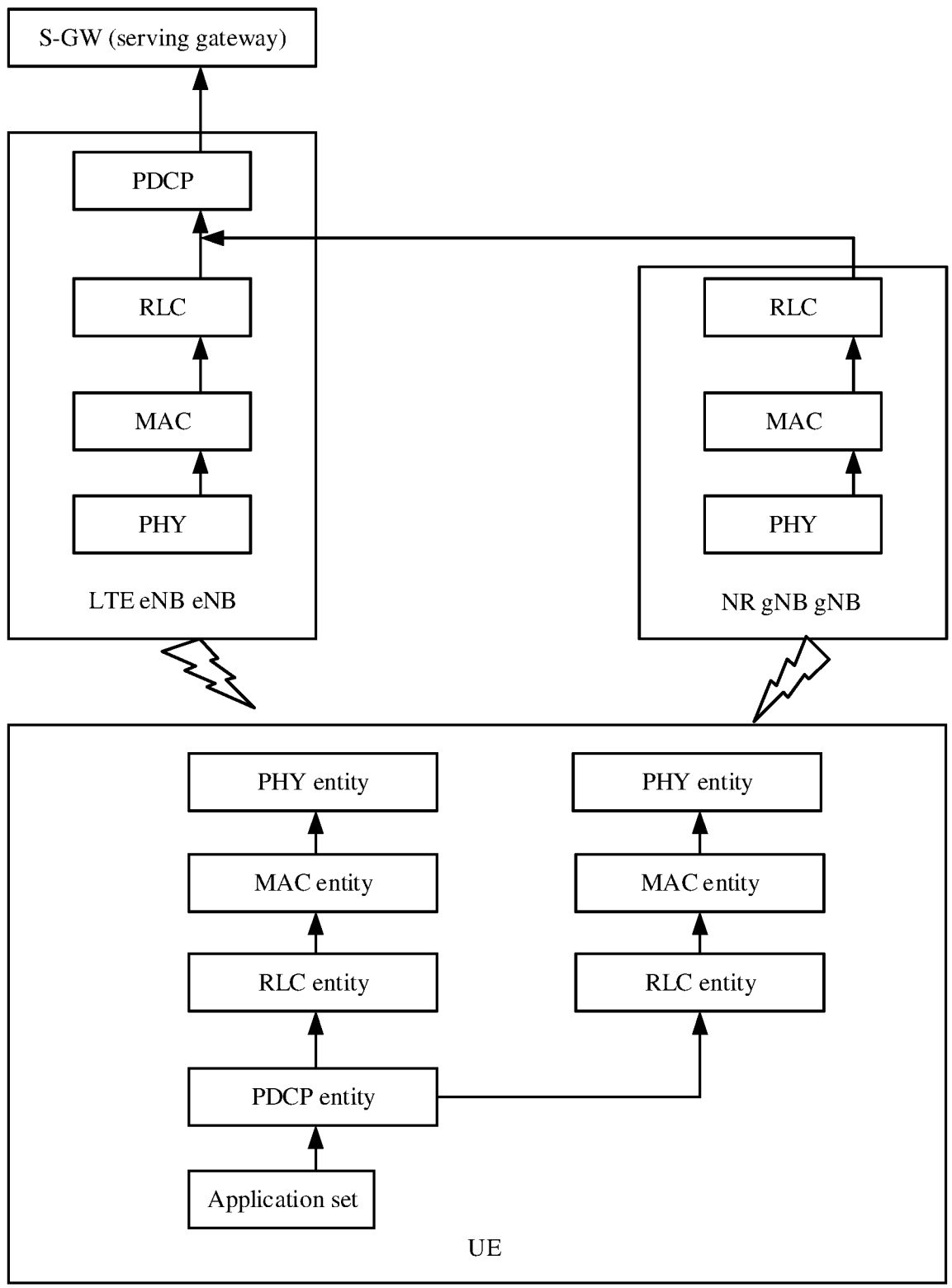
FIG. 5 is a fifth schematic diagram of a structure according to an embodiment of this application.

As shown in FIG. 5, in some embodiments, it may be understood that there is an RLC entity 1 and an RLC entity 2 at an RLC layer. The RLC entity 1 supports LTE data transmission, and the RLC entity 2 supports NR data transmission. However, this is not limited in this application.

Uplink data is used as an example. When upper-layer data is transmitted to a PDCP layer, a data packet of the PDCP layer has an SN (Serial Number, serial number). It may be understood that the SN number is added to the data when the data is transmitted to the PDCP layer. In a normal case, downlink PDCP data packets arrive in ascending order of SN numbers. If the PDCP packets received at a receive end are consecutive, the PDCP packets are directly delivered to an upper-layer application.

In a split mode, when the upper-layer data is transmitted to the PDCP layer, the data needs to be split at the PDCP. In some cases, for example, if quality of a link is poor, a transmitted PDCP packet cannot be transmitted to a peer end in time. In this case, the receive end cannot obtain consecutive PDCP data packets. Therefore, a problem that another link waits for a PDCP packet occurs. On the contrary, if quality of the another link is poor, a same problem may occur.

Figure 6:
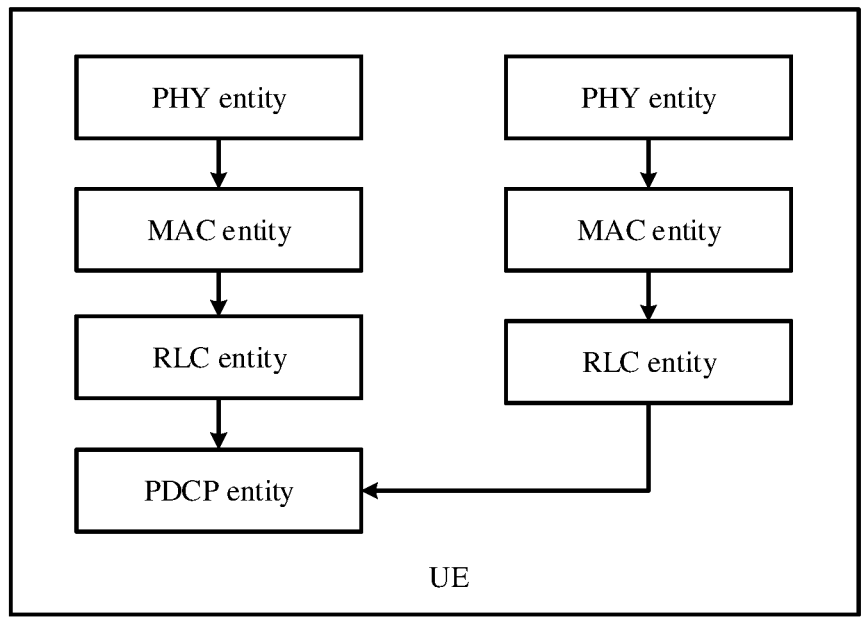
FIG. 6 is a sixth schematic diagram of a structure according to an embodiment of this application.

As shown in FIG. 6, a terminal device for downlink data transmission is provided. The terminal device receives data from an NR base station and an LTE base station, and the data is converged at a PDCP layer. In some scenarios, due to a network problem or the like, delays of two links may be different, and data waiting or freezing may occur.

Figure 7:
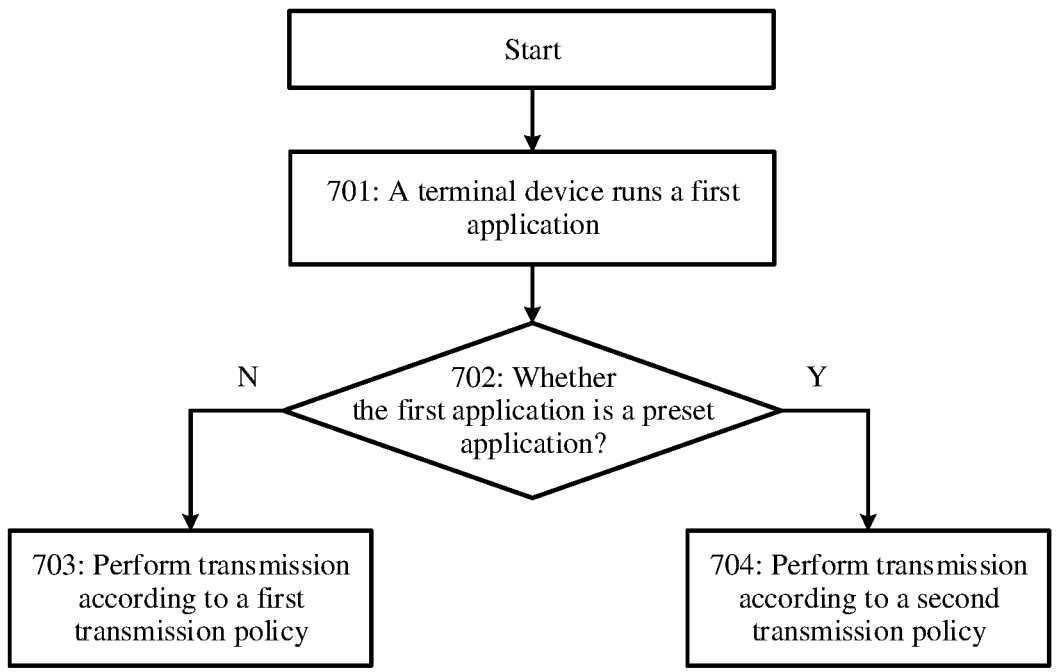
FIG. 7 is a first schematic diagram of data transmission according to an embodiment of this application.

Based on this, as shown in FIG. 7, an embodiment of this application provides a new data split method. First, uplink data of a terminal device is used as an example. Whether to perform split transmission on the uplink data may be determined based on an application that the terminal device is currently running. Details are as follows:

Step 701: The terminal device runs a first application.

The terminal device may receive an operation of opening the application by a user. For example, the operation may be opening the application by clicking an icon of the application on a desktop, or by using a shortcut method, for example, a status bar or HiBoard. The terminal device is in a dual-connectivity network. To be specific, the terminal device may transmit data through an LTE link and an NR link. A network identifier on the desktop of the terminal may be displayed as a 5G or 4G network identifier.

In some embodiments, the operation of the user may further be received to switch a background application to a foreground task.

Step 702: The terminal device determines whether the first application is a preset application. When the first application is the preset application, step 407 may be performed; or when the first application is of a non-preset type, step 703 may be performed.

Step 703: When the terminal device determines that the first application is a non-preset application, the terminal device may send the data according to a first data transmission policy.

In some embodiments, the first data transmission policy may mean that split transmission is not performed on data packets. That is, the data packets are transmitted through a channel with a high priority. It should be noted that, in an existing non-standalone NSA mode, to use an NR resource to a greater extent, a higher priority is usually set for an NR channel. That is, the uplink data is transmitted through the NR channel by default. Specifically, it is stipulated in an existing protocol that, in a data split mechanism, a split may be determined by setting a split threshold based on sizes of the data packets. To transmit the uplink data through the NR channel, the split threshold may be set to be large (for example, infinite), so that split transmission is not performed on the data packets. Specific implementation is as follows:

```
more Than One RLC sequence (
    primary Path sequence (
        cell group cellGroupId
        logicalChannel logicalChannel Identity
    }
    Ul-data Duplication Threshold   Ul-data split Threshold
    Pdcp- Duplication boolean
}
```

Ul-data Duplication Threshold indicates a packet duplication threshold of an uplink data packet.

Ul-data split Threshold indicates an uplink split threshold.

In some embodiments, a data packet for running the first application may alternatively be transmitted through an LTE or NR link with a high priority based on a network or UE configuration. A priority of a link may be set based on the following information of the link: a delay, a packet loss rate, signal strength or quality, a size or amount of data in a buffer, a TA (Timing Advance, timing advance), a bit error rate at a MAC layer, a signal-to-noise ratio (SINR), a maximum value of SR continuous sending (SR-TransMax), a T310 timer, a size of a to-be-sent data packet, and whether EN-DC is enabled. For example, when signal quality of the NR link is better than that of the LTE link, the data packet for running the first application may be sent to the network through the NR link.

In some other embodiments, the first data transmission policy may alternatively mean that split transmission is performed on data packets. For example, whether the data packets are greater than a threshold may be determined. When the data packets are greater than the threshold, split transmission may be performed. To be specific, the data packets are transmitted through the LTE link and the NR link.

Step 704: When the terminal device determines that the first application is the preset application, the terminal device may transmit the data according to a second data transmission policy.

In some embodiments, the terminal device may identify a specific application by using a whitelist, for example, by monitoring a package name of a foreground application or an activity name. Preset applications are usually applications that have a high requirement on a delay or a packet loss rate. When running the applications, the user does not expect a case such as freezing to occur. A typical application includes, for example, a game application, a voice and video chat application, or an application in the following scenario: an OTT (over-the-top) voice call data packet, a laser tag data packet, or a DNS (Domain Name System) data packet.

In some embodiments, the terminal device may identify a name of the current application by using a UUID (universally unique identifier) or a PID (process ID).

In some embodiments, the second data transmission policy is relative to the first data transmission policy. The first data transmission policy may be set by default, or may comply with an existing standard protocol. The terminal device is required to enable the second data transmission policy. In addition, after the policy is enabled, a data packet is sent through a low-delay channel.

In some embodiments, the low-delay channel may be a channel with a first priority. Transmission quality of the channel is usually better than that of the other channel. The terminal device may determine priorities of the two channels by detecting some specific conditions or parameters. For example, parameters such as delays and packet loss rates of the two channels may be detected in real time or periodically. A channel with better transmission quality may be configured to transmit a data packet of data that is more sensitive to a delay.

Figure 8:
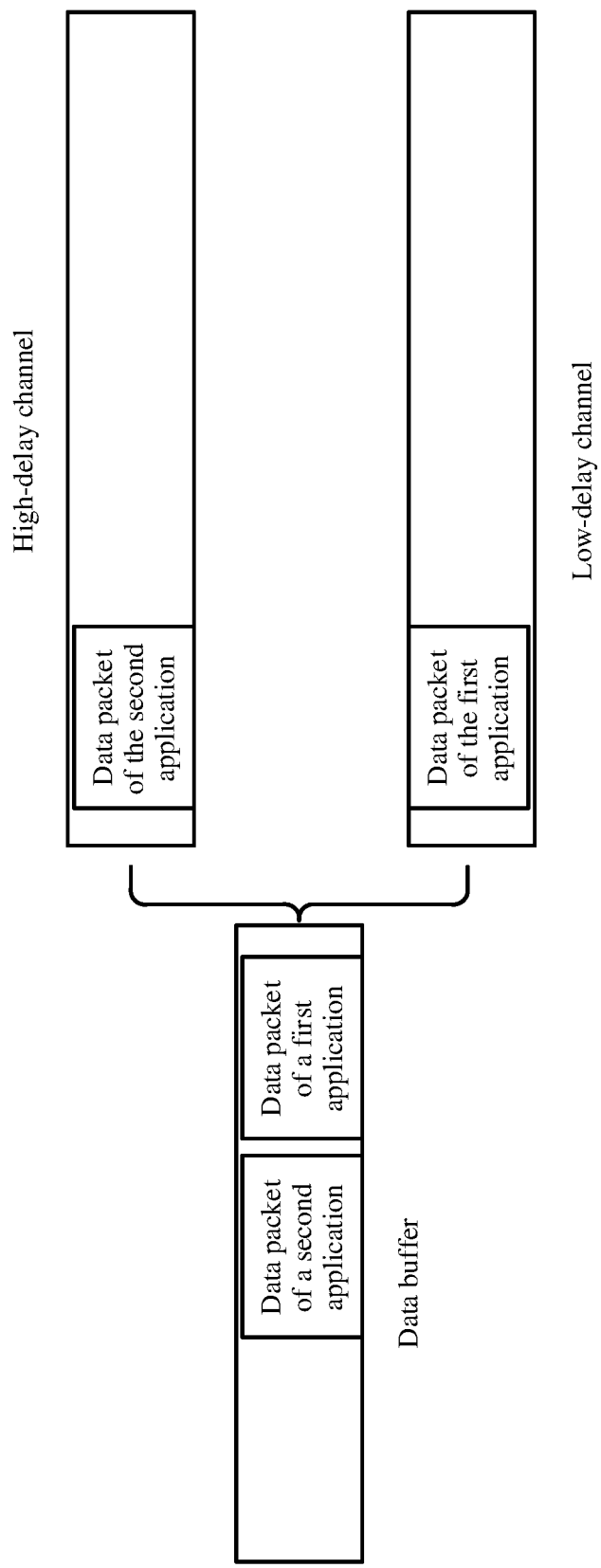
FIG. 8 is a second schematic diagram of data transmission according to an embodiment of this application.

In this embodiment of this application, when it is detected that the first application is the preset application, a data packet may be sent through the low-delay channel. Specifically, FIG. 8 is a schematic diagram of data sending according to the second data transmission policy. That is, when a data packet is on a PDCP layer entity, whether to send the data packet through the low-delay channel or a high-delay channel is determined by determining whether the data packet is a data packet of the first application or a data packet of a second application. Specifically, the data packet of the first application may be sent through a low-delay link, and a data packet that is not of the first application may be sent through the high-delay channel.

In this embodiment of this application, a data transmission channel in the dual connectivity can be selected by determining an application that is being run. Compared with a conventional split manner, the method has better transmission efficiency, lower power consumption, and better user experience.

Figure 9:
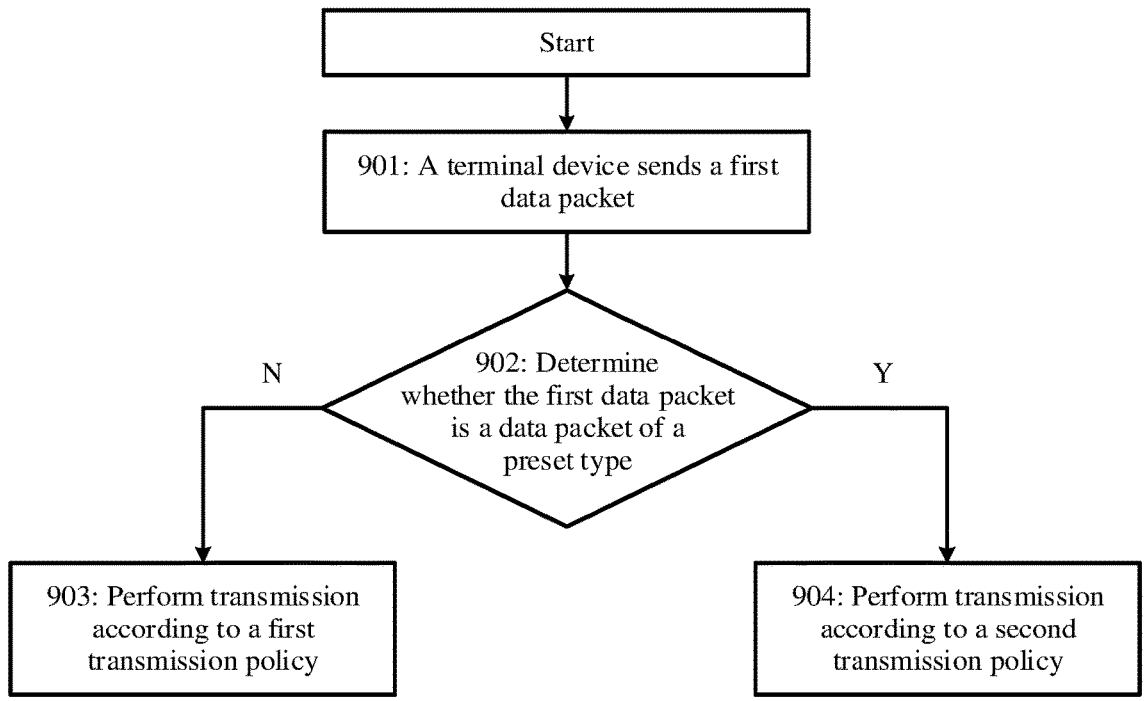
FIG. 9 is a third schematic diagram of data transmission according to an embodiment of this application.

As shown in FIG. 9, an embodiment of this application further provides another data split method. For example, a terminal device sends uplink data. Whether to perform split transmission may be determined based on a type of a data packet that the terminal device is currently sending. Details are as follows:

Step 901: The terminal device determines to send a first data packet.

The terminal device may run a first application. The first application may be a foreground application, or may be a background application. Alternatively, a plurality of applications may be run simultaneously. The terminal device is in a dual-connectivity network. To be specific, the terminal device may transmit the data through an LTE link and an NR link.

In some embodiments, the terminal device may send the first data packet because the terminal device receives a search request for a browser application from a user, or receives a download request for an application market from the user.

Step 902: When determining that the first data packet is a data packet of a non-preset type, the terminal device performs step 903; or when determining that the first data packet is a preset data packet, the terminal may perform step 904.

In some embodiments, a type of current data may be determined by using a packet name of the data packet. Some delay-sensitive data packet types, for example, an OTT voice call data packet, a laser tag data packet, and a DNS data packet, may be identified in a labeling manner.

Step 903: When the terminal device determines that a type of the first data packet is the non-preset data packet type, the first data packet may be transmitted according to a first transmission policy. The first transmission policy may be the same as that in step 703.

Figure 10:
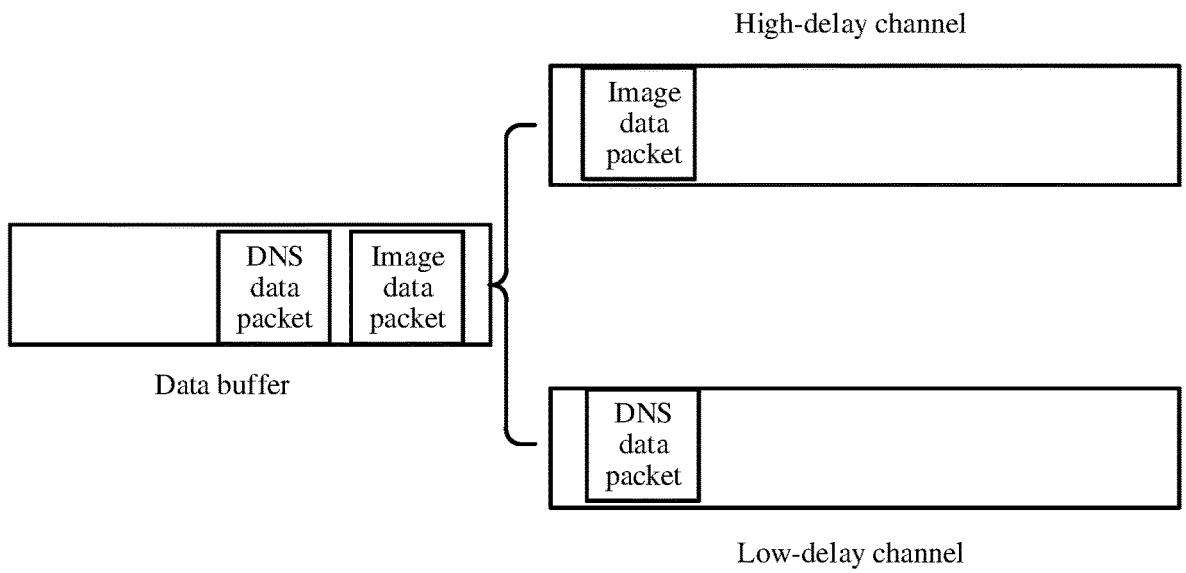
FIG. 10 is a fourth schematic diagram of data transmission according to an embodiment of this application.

Step 904: When the terminal device determines that a type of the first data packet is a preset data packet type, the terminal device transmits the first data packet according to a second transmission policy, where the second transmission policy may be the same as that in step 704. Specifically, FIG. 10 is a schematic diagram of data sending according to the second policy. That is, the DNS data packet may be sent through a low-delay channel.

In some embodiments, whether a data packet is sent through the low-delay channel or a high-delay channel may alternatively be determined directly by using a hardware resource occupation status. For example, when the terminal device invokes a microphone and a camera, it may be considered that the terminal device needs to send a voice packet that may be sent through the low-delay channel.

Compared with the embodiment shown in FIG. 7, this embodiment of this application can have higher accuracy by performing policy adjustment on a type of a data packet, higher transmission efficiency, lower power consumption, and better user experience.

Figure 11:
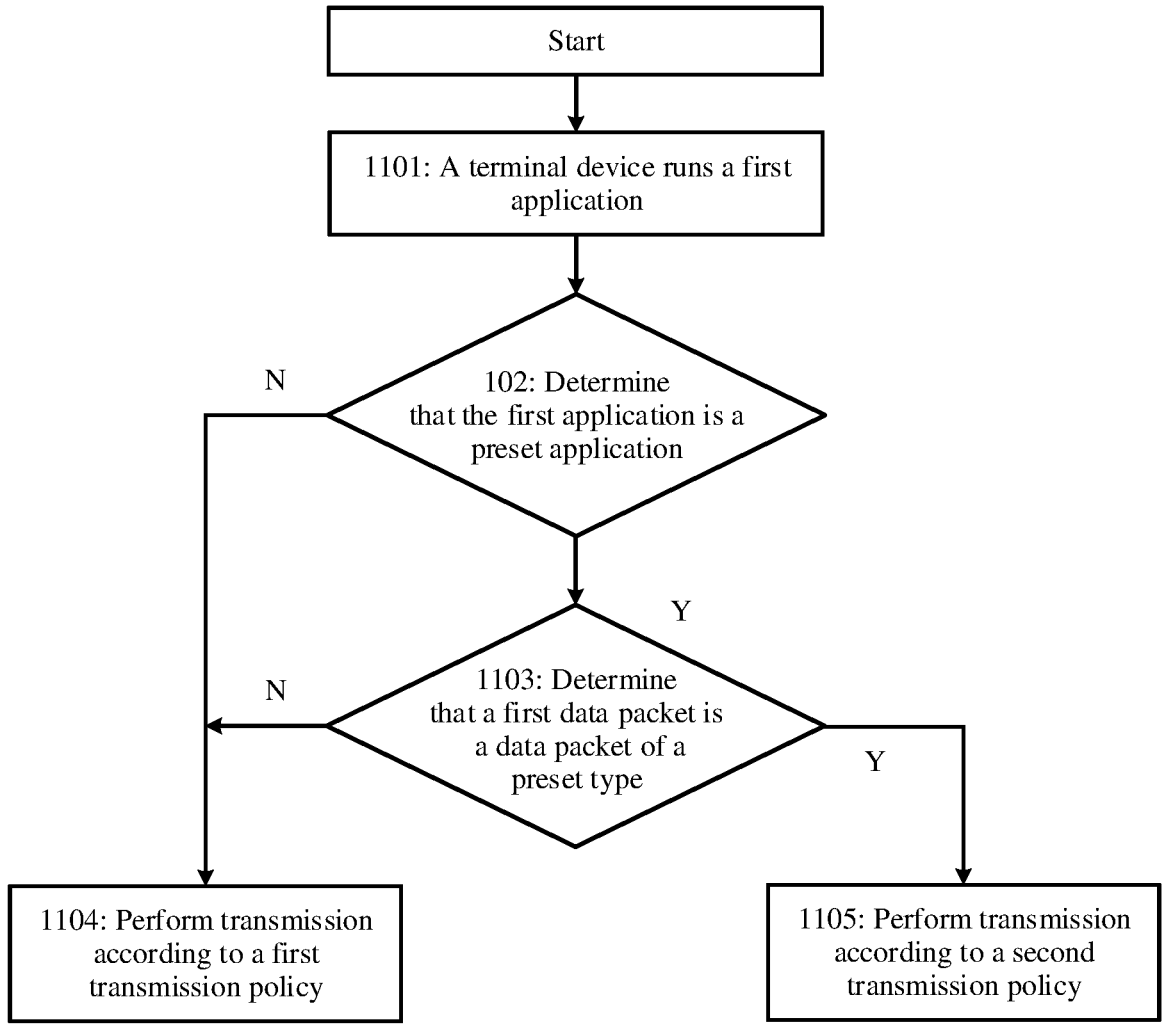
FIG. 11 is a fifth schematic diagram of data transmission according to an embodiment of this application.

As shown in FIG. 11, an embodiment of this application further provides a new data split method. A split policy is selected with reference to a status of a terminal device and a type of a to-be-sent data packet. Details are as follows:

Step 1101: The terminal device runs a first application. The step may be the same as step 701.

Step 1102: When the terminal device determines that the first application that is currently being run is a preset application, step 11053 is performed; or when the terminal device determines that the first application that is being run is a non-preset application, step 1104 is performed.

A method for determining the first application that is currently being run may be the same as that in step 704.

Step 1103: When determining that the first application that is currently being run is the preset application, the terminal device further determines whether a data packet of the current first application is a data packet of a preset type. When the terminal device determines that the first data packet is the data packet of the preset type, step 1105 is performed; or when the first data packet is a data packet of a non-preset type, step 1104 is performed.

In some embodiments, a method for determining whether a type of the first data packet is the preset data packet may be the same as that in step 703.

In some embodiments, because the application that is currently being run has been determined in step 1102, whether to enable step 1105 may be further determined based on a reported status of the first application. For example, some game applications may be classified into a login state and a battle state. When it is detected that the first application is the preset application and is in a preset state, step 1105 may be performed. Generally, in the battle state, a user has a higher requirement on a data delay. The terminal may obtain a state of the current application through an API interface.

In some embodiments, whether to enable a second transmission policy may be further determined with reference to another state of the current terminal device, for example, whether a microphone is in an on state for a long time, or whether a camera is enabled. When the microphone or the camera of the user is in an on state for a long time, it may be considered that the user is transmitting a voice data packet or a video data packet. The foregoing packet has a high requirement on a delay, and the second transmission policy may be used.

In some embodiments, a type of current data may be further determined by using a port number. For example, when the port number is 53, a currently transmitted DNS data packet may be determined.

In some embodiments, whether to use the second transmission policy is determined by using a package name of the application. For example, when WeChat is run in a foreground and sends a UDP data packet, it is determined that the terminal device is currently in a voice or video call.

Step 1104: When it is determined that the type of the first data packet is a data packet that is of a preset type and that is not of the first application, or the first data packet is in a preset state, step 1104 may be performed.

The terminal device may use the first transmission policy. This may be the same as step 703.

Step 1105: When it is determined that the first data packet is the data packet of the preset type, the second transmission policy may be performed.

The second transmission policy may be the same as that in step 704.

In this embodiment of this application, the terminal device determines, by determining a preset application type and with reference to a data packet type or a hardware resource occupation status, that an uplink split transmission policy is used for a specific data packet of a specific application, that is, data of a delay-sensitive data packet is transmitted through a low-delay channel.

Figure 12:
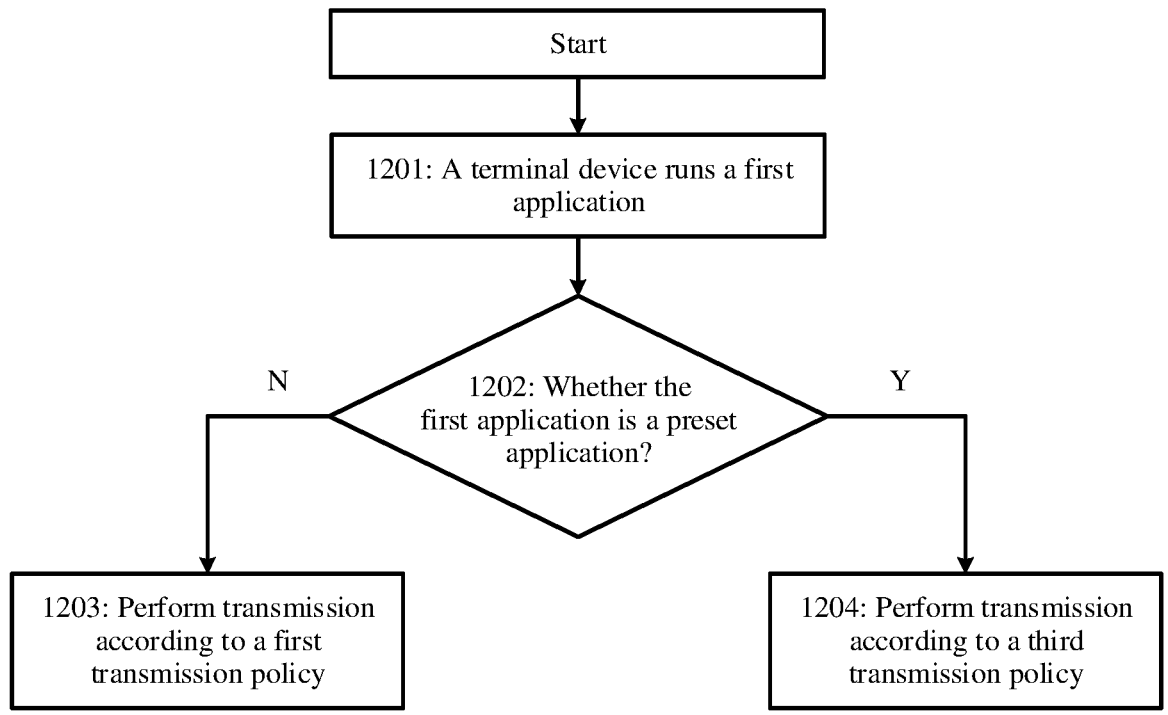
FIG. 12 is a sixth schematic diagram of data transmission according to an embodiment of this application.

It should be noted that this application further provides a new data transmission method, to be specific, a method in which whether to enable a third transmission policy is determined by determining whether a first application is a preset application. As shown in FIG. 12:

For steps 1201 to 1203, refer to the method in steps 701 to 703.

Step 1204: When it is determined that the first application is the preset application, data may be sent by using the third transmission policy.

In some embodiments, the third transmission policy may be a method in which a data packet is autonomously duplicated (Duplication). To be specific, when determining that an application is a preset application, the terminal device autonomously duplicates, when sending the data packet, to-be-sent data to obtain two data packets, and respectively sends the two data packets to a network device through an LTE link and an NR link.

In some embodiments, some scenarios or data packets that have a high requirement on a data delay are as follows. Specifically, a game application is used as an example. Games may be classified into different states, for example, a battle state and a login state. Generally, a user has a high requirement on a delay in the battle state. For another example, when the user is in a voice or video call by using a third-party APP, the terminal device first determines whether an application that is currently being run in a foreground is a preset application. The preset application may be set by using a whitelist, or may be manually added by the user. When it is determined that the foreground application is the preset application, whether the application is in a voice or video state is further determined by using a hardware resource occupation status, for example, by determining an occupation status of a MIC or a speaker. Further, if the user connects to another device through Bluetooth, whether the application is in the voice or video state may be further determined by using a usage status of a peripheral MIC.

| Service type. | Detection policy |
|---|---|
| DNS | A modem detects that a UDP data packet with a port 53 is a DNS data packet, and a continuous delay of the DNS is long |
| Arena of Valor | An AP side of a Huawei terminal obtains, through hooking, a status of Arena of Valor to an SDK (Localsocket) mechanism provided by the game Arena of Valor |
| WeChat call | WeChat is in a foreground, a call activity is currently being displayed, the WeChat call is identified because microphone recording is in an occupied state, and a voice bit rate is lower than a minimum bit rate |
| Hicall | A hicall interface reports whether a user is in a call state, and the hicall automatically reports freezing. |

In the foregoing scenario, if freezing is detected, a modem data packet is delivered to enable sending through a low-delay channel. If no secondary channel is configured on a network side, transmission through the secondary channel may be automatically enabled.

Figure 13:
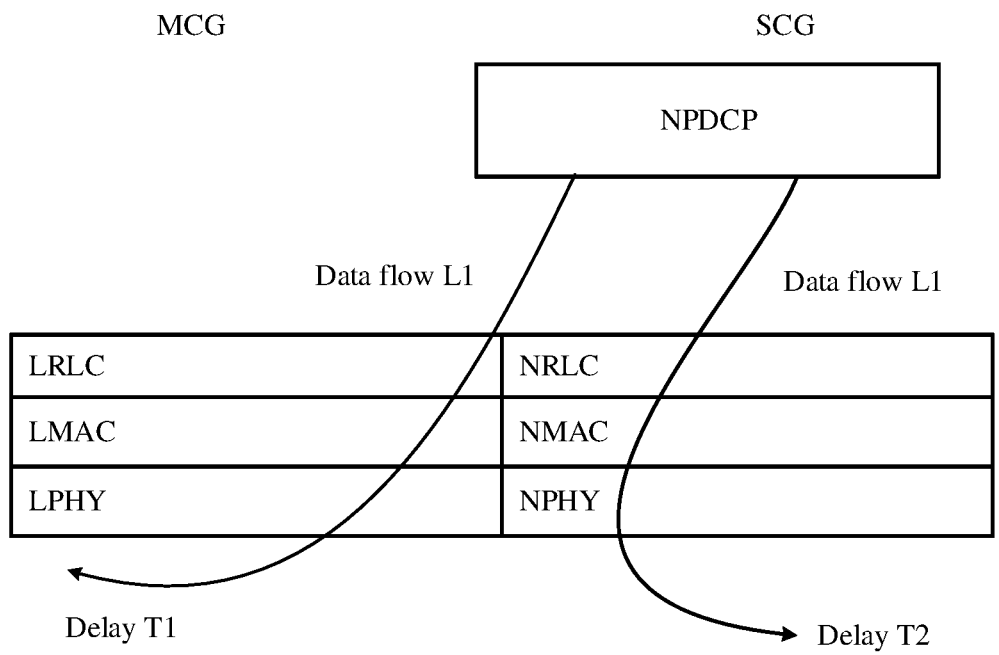
FIG. 13 is a seventh schematic diagram of data transmission according to an embodiment of this application.

To relieve congestion caused by retransmission that cannot be completed on one link for a long time, some sparse data packets that fail to be transmitted need to be synchronously transmitted on the other link. To accelerate upward delivery of data packets on a receive side, and increase a probability of receiving a data packet by PDCP on the receive side, FIG. 13 is a schematic diagram of data flow transmission according to a third transmission policy. After data is duplicated at the PDCP layer, data is respectively sent to an LTE link and an NR link, and delays generated on the two links may be different. A network side may determine, by using the delays of the two links, a link on which a data packet is to be discarded.

As shown in FIG. 13, MCG: master cell group, and SCG: secondary cell group. It may be simply understood as that a group to which a cell in which UE first initiates random access (RACH) belongs is the MCG. If dual connectivity is not performed, concepts of the MCG and SCG are not involved. Alternatively, it may be understood as that, if dual connectivity is not performed, a cell group corresponds to the MCG.

In this embodiment of this application, autonomous packet duplication and sending are required for a specific delay-sensitive service, and a duplicate packet needs to be deleted by using a duplicate packet deletion technology on the network side. The network device receives two data packets, and a data packet on a side with a larger transmission delay is normally discarded.

In an EN-DC scenario, LTE and NR bandwidth resources are fully used. Autonomous packet duplication is for reducing freezing caused because ENDC in an NR weak coverage scenario does not satisfy a split threshold, and no split to a secondary path is performed. When some data packets fail to be sent, a PDCP layer on the network side needs to continuously wait for corresponding data packets and block upward delivery of another data packet. When a data packet is transmitted at an RLC layer, according to an existing protocol, transmission of the data packet is completed only when an ACK is received from the receive side. Based on an EN-DC split feature, data packets are respectively transmitted on two transmission paths. If a transmission delay of a data packet on one path is long due to an exception on the transmission path, an overall rate is affected. Therefore, a data transmission policy through data duplication is for improving transmission reliability of the two paths.

An exit condition of this solution is that an application freezes on a low-delay channel or a foreground application switches to a background application. Freeze detection is implemented based on freeze information autonomously reported by the foreground application or RTF detection of the foreground application.

Figure 14:
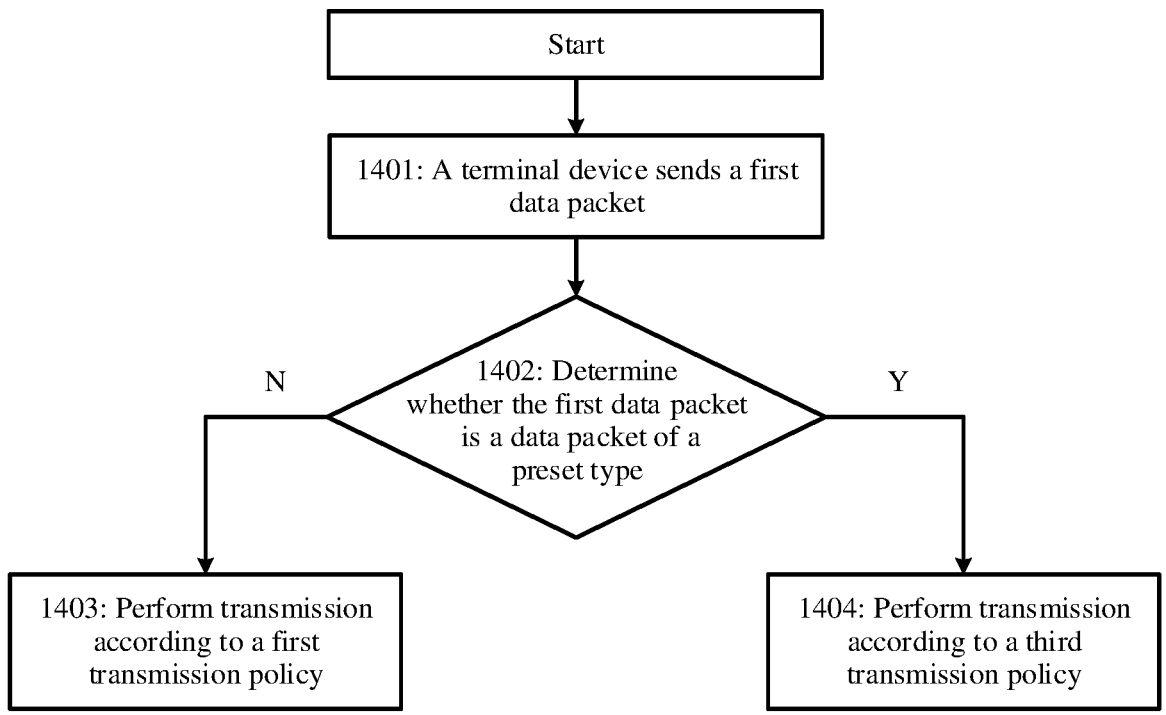
FIG. 14 is an eighth schematic diagram of data transmission according to an embodiment of this application.

This application further provides a new data transmission method, to be specific, a method in which whether to enable a third transmission policy is determined by determining whether a first application is a data packet of a preset type. As shown in FIG. 14:

Steps 1401 to 1403 may be the same as steps 901 to 903.

Step 1404: When determining that the first data packet is of the preset data packet type, the terminal device may transmit data by using a packet duplication method. The method may be the same as the method in step 1204.

Figure 15:
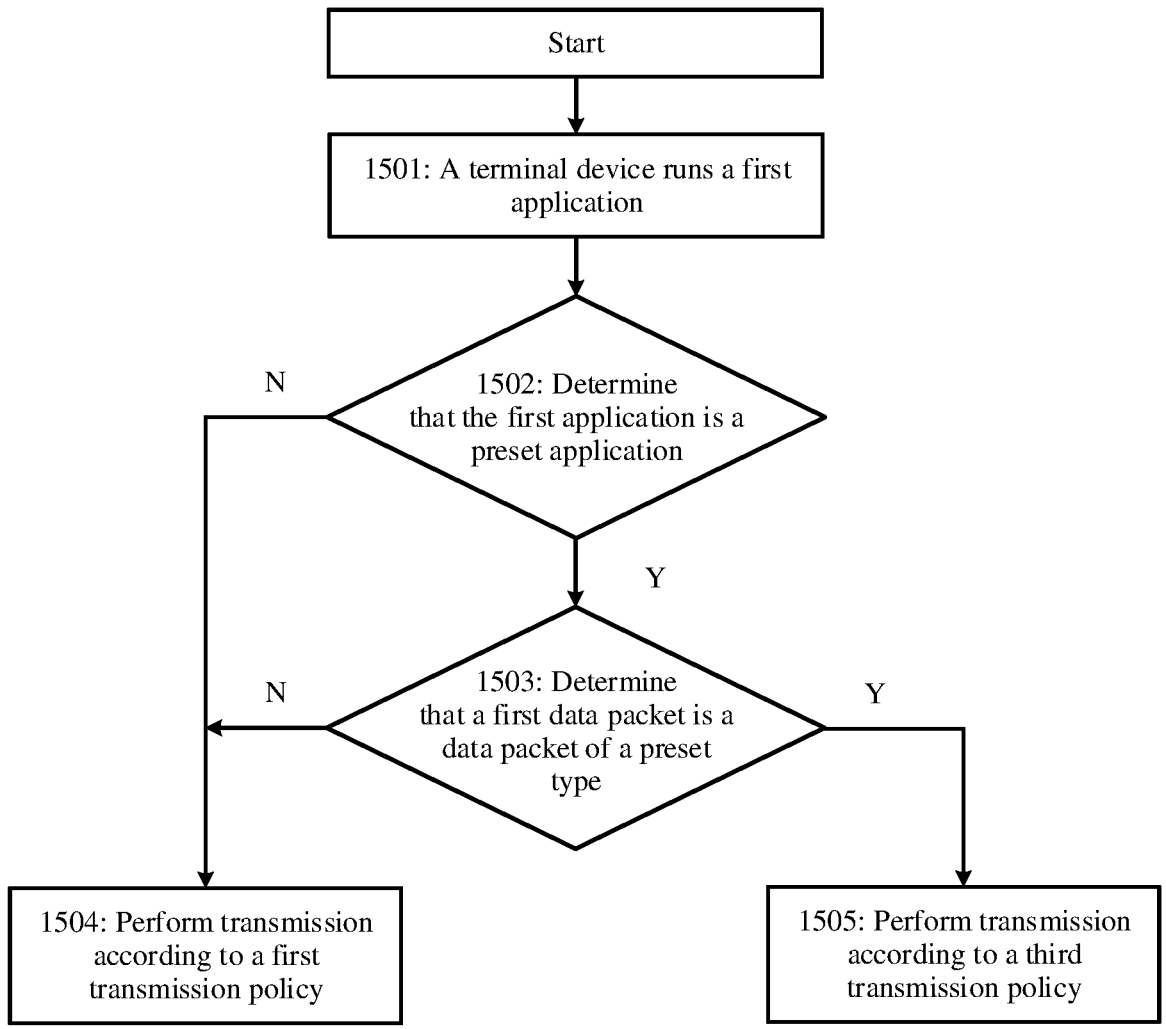
FIG. 15 is a ninth schematic diagram of data transmission according to an embodiment of this application.

This application further provides a new data transmission method, to be specific, a method in which whether to enable a third transmission policy is determined with reference to an application and a type of a data packet. As shown in FIG. 15:

Steps 1501 to 1504 may be the same as steps 1101 to 1104.

Figure 16:
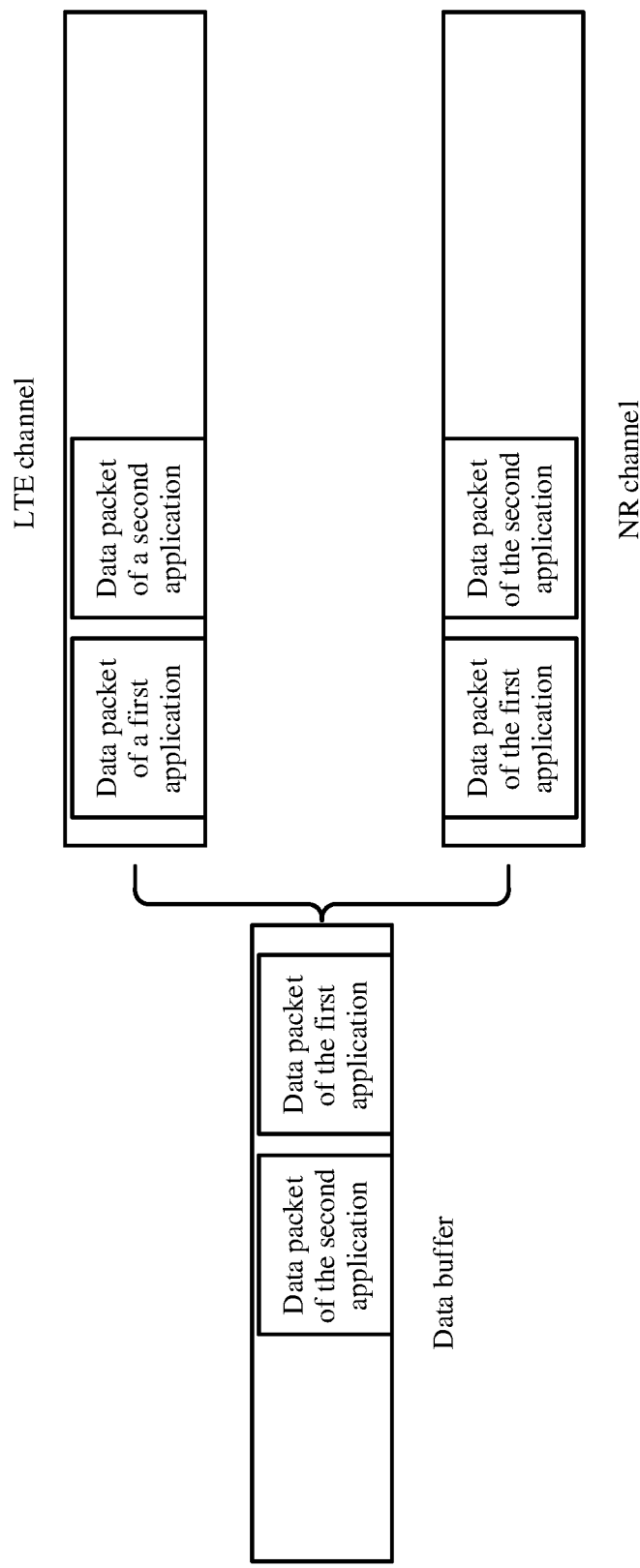
FIG. 16 is a tenth schematic diagram of data transmission according to an embodiment of this application.

Step 1105: When it is determined that the type of the first data packet is the preset data packet type, transmission may be performed by using the third transmission policy, for example, the method in step 1204. As shown in FIG. 16, a data packet may be synchronously transmitted through two channels in a duplication manner.

In some embodiments, a method for determining whether the type of the first data packet is the preset data packet may be the same as that in step 703.

In some embodiments, because the application that is currently being run has been determined in step 1102, whether to enable step 1105 may be further determined based on a reported status of the first application. For example, some game applications may be classified into a login state and a battle state. When it is detected that the first application is the preset application and is in a preset state, step 1105 may be performed. Generally, in the battle state, a user has a higher requirement on a data delay. The terminal may obtain a state of the current application through an API interface.

In some embodiments, whether to enable the third transmission policy may be further determined with reference to another state of the current terminal device, for example, whether a microphone is in an on state for a long time, or whether a camera is enabled. When the microphone or the camera of the user is in an on state for a long time, it may be considered that the user is transmitting a voice data packet or a video data packet. The foregoing packet has a high requirement on a delay, and the third transmission policy may be used.

In some embodiments, a type of current data may be further determined by using a port number. For example, when the port number is 53, a currently transmitted DNS data packet may be determined.

In some embodiments, whether to use the third transmission policy is determined by using a package name of the application. For example, when WeChat is run in a foreground and sends a UDP data packet, it is determined that the terminal device is currently in a voice or video call.

In this embodiment of this application, the terminal device determines, by determining a preset application type and with reference to a data packet type or a hardware resource occupation status, that a specific data packet of a specific application is transmitted by using a duplication method. In this way, transmission efficiency is greatly improved.

Figure 17:
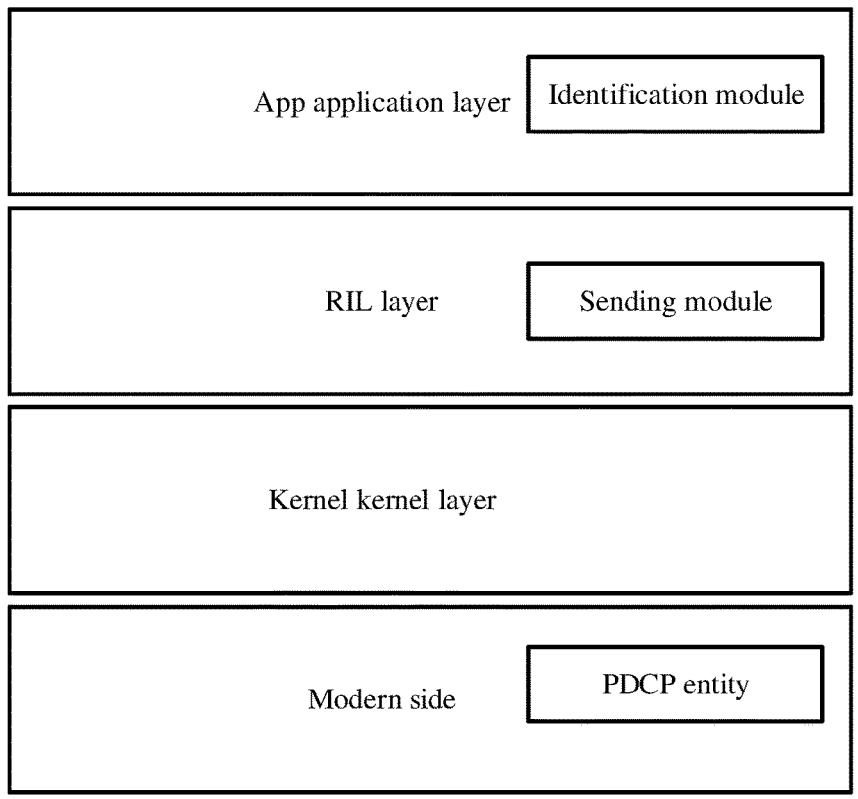
FIG. 17 is an eleventh schematic diagram of data transmission according to an embodiment of this application.

An embodiment of this application further provides a schematic diagram of an architecture of a terminal device for implementing the foregoing embodiments. As shown in FIG. 17, a software architecture of the terminal device may include an application layer, a RIL layer, a kernel kernel layer, and a modem side.

The application layer includes an identification module. The identification module is mainly configured to identify a current application, and monitor a package name of the application or an activity name.

In some embodiments, occupation statuses of some physical resources, for example, a Mic or a camera, may be further monitored. In a possible scenario, for example, in a voice scenario of WeChat, autonomous packet duplication transmission needs to be enabled. Detection logic is: If the corresponding activity is in a foreground, a microphone interface is in an enabled state for a long time, and the camera is not enabled, the autonomous packet duplication transmission in the foregoing embodiment needs to be performed.

In some embodiments, a connection status of a peripheral, for example, a connection status of a Bluetooth headset, a watch, or a band, may be further monitored. For example, if Bluetooth headset connection and camera enabling are detected, a packet duplication function is enabled to transmit a data packet.

In some embodiments, a status of the application may be further monitored. For example, a packet duplication function is enabled in a battle state of a game application.

The RIL layer is an interface layer between the application layer and a physical layer, and is mainly for transmitting control plane data.

The kernel layer includes a configuration mainly used for an uplink packet duplication policy. For example, the transmission policy may be enabled by using a flag bit. The application layer generally can identify only a type of the application or the activity, and generally cannot identify a type of an application-related data packet. In this case, the kernel layer is required to identify the packet type, and the corresponding data packet is labeled. For example, an acc_stat field of an ock structure may be used for definition. When any bit in the field is 1, packet duplication transmission or split transmission may need to be enabled for the data packet, and the field is sent to the modem via the data packet.

In some embodiments, the kernel layer may store an identifier of a preset application or an identifier of a data packet. When identifying that a foreground application is the preset application, the application layer sends an instruction to the kernel layer to enable packet duplication data transmission.

In some embodiments, when the foreground application switches to a non-preset application, the application layer further sends an instruction to disable a packet duplication function. For example, an acc_stat field of the ock structure may be used for definition. When any bit in the field is set to 1, packet duplication transmission or split transmission needs to be enabled for the data packet, and the field is sent to the modem via the data packet.

In some implementations, the kernel layer may store a correspondence between preset applications and/or preset data packet types. The following table is used as an example.

| Application name | Data packet type | Whether to be enabled |
|---|---|---|
| Application A | Voice data packet | Yes |
| Application A | Image data packet | No |
| Application B | Image data packet | No |

The kernel layer determines, based on an operation of the application layer, whether to enable a packet duplication or split policy for a to-be-sent packet, and parses an application name in the data packet when receiving the data packet sent by the application layer, to further determine a type of the data packet.

The modem side is mainly for executing the policy. The modem determines, based on upper-layer conditions, whether to enable packet duplication transmission, and parses, from a packet, whether to support autonomous packet duplication transmission. That is, a flag bit in the acc_stat field may be used.

In some embodiments, the modem monitors transmission statuses of data packets on two paths. If a data packet is not successfully transmitted on either of the paths for a long time, or a sending delay of a data packet buffered in PDCP exceeds a time threshold, the PDCP enables a packet duplication duplication manner to process the data packet.

Figure 18:
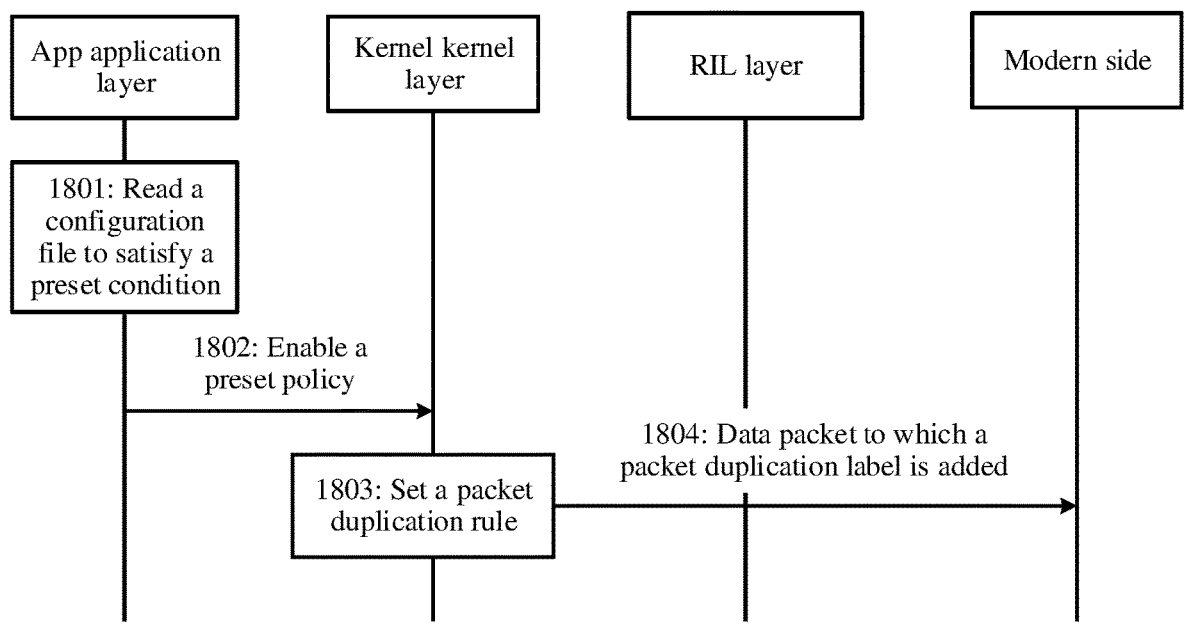
FIG. 18 is a twelfth schematic diagram of data transmission according to an embodiment of this application.

The foregoing framework is also applicable to execution of a second transmission policy, namely, a split policy. Details are shown in FIG. 18.

Step 1801: The application layer reads a configuration file, and identifies whether a preset condition is satisfied currently.

Specifically, the application layer may include one APK. A status of a current application may be monitored by using the APK. When it is determined that the application that is currently being run is a preset application, an instruction may be sent to the kernel layer.

Step 1802: A packet duplication function policy is enabled when a condition is satisfied.

When it is determined that the application that is currently being run is the preset application, the instruction may be sent to the kernel layer, where the instruction is for enabling the packet duplication transmission policy.

Step 1803: The kernel layer enables a packet duplication rule.

According to the descriptions in FIG. 17, the kernel layer includes the configuration mainly used for the uplink packet duplication policy. For example, the transmission policy may be enabled by using the flag bit.

Step 1804: To-be-sent data is labeled and sent to the modem side.

Figure 19:
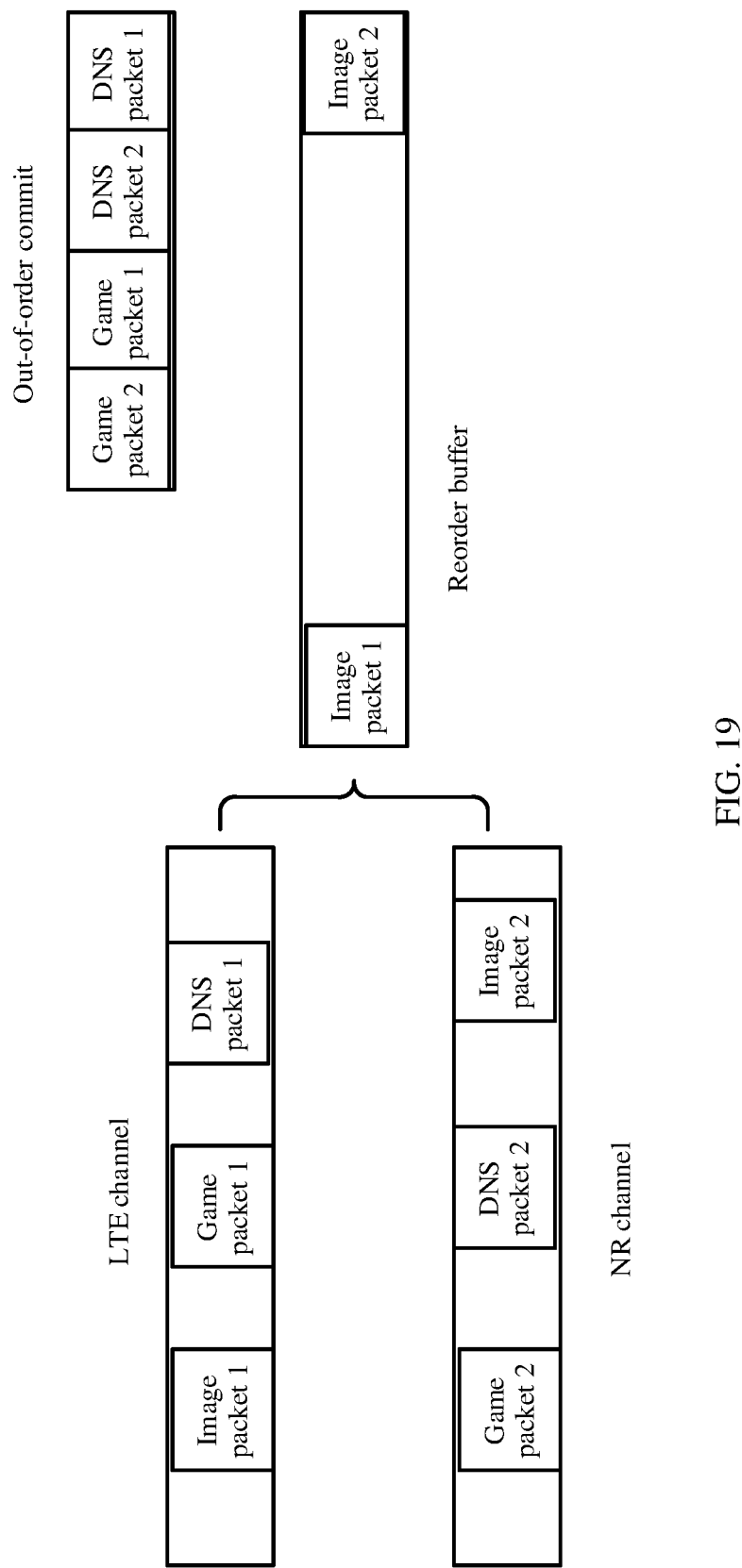
FIG. 19 is a thirteenth schematic diagram of data transmission according to an embodiment of this application.

An embodiment of this application further provides a downlink data transmission method. Compared with split or duplication transmission of uplink data, downlink data receiving is that a PDCP layer of a terminal device receives data from an LTE link and an NR link, aggregates the data, and sends the aggregated data to an upper layer. As shown in FIG. 19, the terminal device receives data packets, for example, a DNS data packet 1, a game packet 1, and an image packet 1, from an LTE channel, and further receives an image data packet 2, a DNS data packet 2, and game data packet 2 from an NR channel. When the terminal device identifies, based on data packet types, that the DNS data packets and the game data packets are delay-sensitive data packets, the data packets are placed in a non-out-of-order reorder buffer, and directly sent to an upper-layer application. If data packets are non-delayed data packets, for example, the image data packets, the data packets enter an out-of-order reorder buffer. A feature of the reorder buffer is that the data packets are sent to the upper-layer application together only after preset time or data packets of a preset quantity and preset sizes reach a threshold.

For example, in an image download scenario, a DNS network side reply data packet, a game downlink data packet, and the like that require real-time transmission are placed together with the image data packets, to perform out-of-order reassembly. As a result, the game data packets are delayed and the DNS parsing becomes slow. In an LTE channel and an NR channel, a delay of a data packet on one channel causes an overall data transmission delay. Therefore, in the present invention, an out-of-order commit solution needs to be used, in a centralized manner, for service data packets (for example, a DNS data packet, a game data packet, a voice call data packet, a live data stream, and a hybrid service scenario) that are tolerant towards an out-of-order state.

In a downlink, a delay-sensitive service and a delay-insensitive service are distinguished. For delay-sensitive services such as a game and a DNS, out-of-order reorder is not performed, or an out-of-order reorder timer with a small expiring threshold is set. For another service, an out-of-order reorder timer is set based on a delay-sensitive value. Duration of the downlink out-of-order reorder timer is dynamically adjusted based on a value of an RTO in a TCP protocol stack.

A solution principle is that, in an ENDC split scenario in a downlink, the types of downlink data packets and upper-layer service types are identified. Some data packets can be committed in an out-of-order manner. In a scenario in which packet loss occurs in ENDC, submission of data packets that normally arrive is not delayed because of downlink out-of-order reorder.

An embodiment of this application further provides a schematic diagram of an architecture of a terminal device for implementing the foregoing embodiments. As shown in FIG. 17, a software architecture of the terminal device may include an application layer, a RIL layer, a kernel kernel layer, and a modem side.

Four procedures are involved: initialization, enabling downlink out-of-order commit, and stopping downlink out-of-order commit.

The initialization means a package name and an activity name for which autonomous downlink out-of-order commit needs to be enabled are obtained based on a json file for input configuration. The application layer includes an identification module, and the identification module is mainly configured to identify a current application and monitor a package name of the application or an activity name.

In some embodiments, some physical components, for example, a Mic or a camera, may be further monitored. In a possible scenario, for example, in a voice scenario of WeChat, autonomous packet duplication transmission needs to be enabled. Detection logic is: If the corresponding activity is in a foreground, a microphone interface is in an enabled state for a long time, and the camera is not enabled, the out-of-order commit in the foregoing embodiment needs to be performed.

In a scenario in which the downlink out-of-order commit is satisfied, the modem is delivered to enable out-of-order commit. This usually refers to a UDP packet herein.

Figure 20:
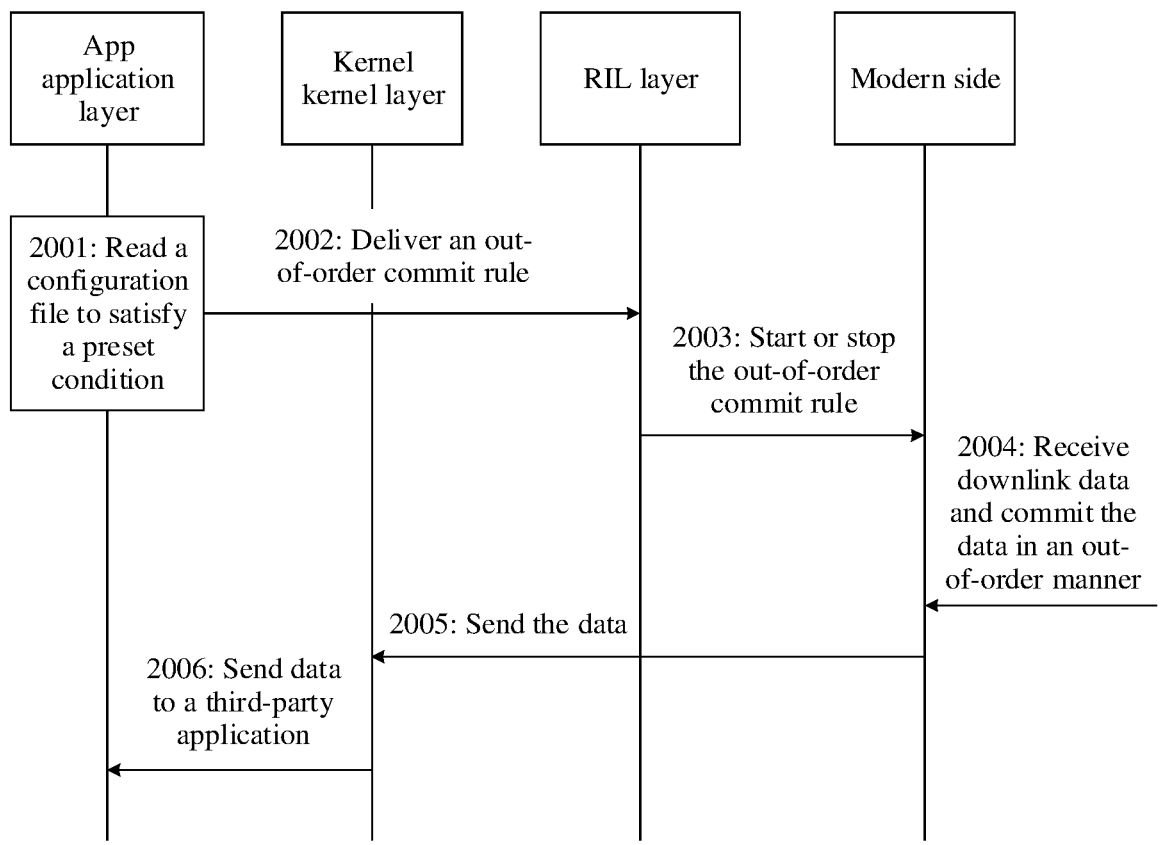
FIG. 20 is a fourteenth schematic diagram of data transmission according to an embodiment of this application.

That the modem determines, based on upper-layer conditions, whether to perform downlink out-of-order reorder takes effect only in an NPDCP out-of-order reorder scenario. Specifically, the modem parses, from a packet, whether to support autonomous packet duplication transmission, and obtains, from an AT command, whether to enable out-of-order submission for the UDP packets (one of the conditions). Details are shown in FIG. 20.

Step 2001: Read a configuration file, and deliver an out-of-order commit rule when a preset condition is satisfied.

The configuration file is read, and identifies an application that is currently being run in a foreground. A specific step is, for example, 703. A control command is sent to an RIL layer when it is determined that the application that is currently being run is a preset application.

Step 2003: When receiving an instruction, the RIL layer sends the out-of-order commit rule to a modem side.

Step 2004: When receiving a downlink data packet, the modem determines a type of the data packet. When determining that the received data packet is of a preset data packet type, the data packet may be committed to the kernel layer. If it is found that the data packet is a data packet of a non-preset type, the data packet may be sent to a buffer in a conventional manner. According to a conventional technology, all downlink data needs to be placed in a reorder buffer. When an amount or a size of received data reaches a buffer threshold, the data is sent to the kernel layer together. In this embodiment, an out-of-order commit manner is used. To be specific, when the modem determines that the downlink data packet is of the preset data packet type, which is usually a delay-sensitive data packet, the modem may immediately send the downlink data packet to the kernel layer without continuing to wait in the buffer, so that transmission efficiency is greatly improved.

Step 2005: Send the data committed in an out-of-order manner to the kernel layer.

When the non-preset data packet type also satisfies a sending condition, for example, when data in the buffer reaches the threshold, the data packet is also sent to the kernel layer.

Step 2006: The kernel layer sends the data packet to a corresponding third-party application.

Figure 21:
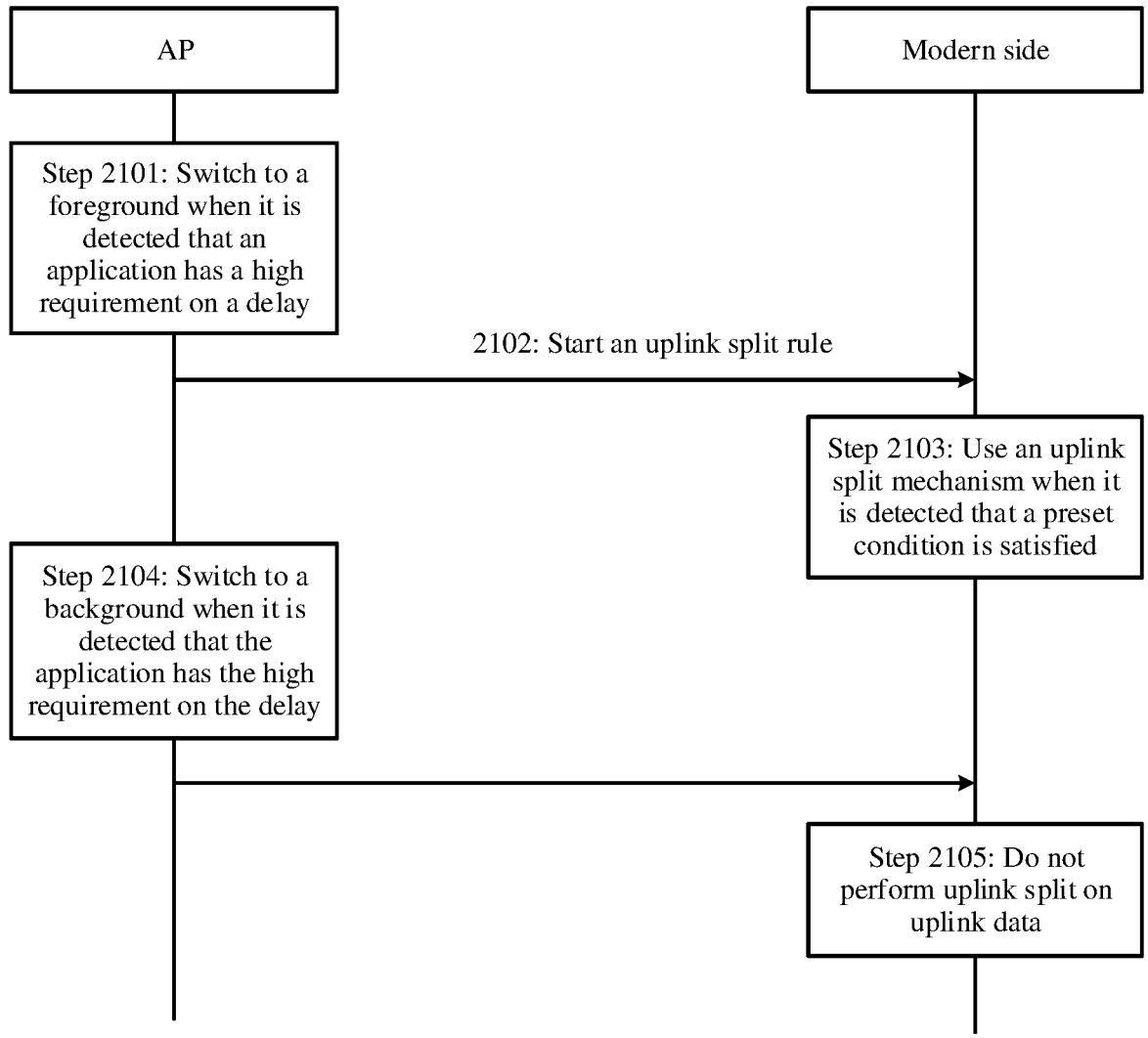
FIG. 21 is a fifteenth schematic diagram of data transmission according to an embodiment of this application.

According to an embodiment of this application, a schematic diagram of interaction between an application processor and a modem is further provided, as shown in FIG. 21.

Step 2101: An AP detects whether a current foreground application is a preset application.

Step 2102: When determining, through detection, that the application that is currently being run is the preset application, the AP may send an instruction to a modem side, where the instruction instructs the modem to enable a split policy.

Step 2103: After receiving the instruction, the modem needs to further determine whether a data packet that needs to be sent is a data packet of a preset type, and enables the uplink split policy when the data packet that needs to be sent is the data packet of the preset type, that is, sends the data packet through a low-delay channel.

Step 2104: If the AP detects that the current foreground application switches to a non-preset application, the AP sends a command to the modem side, where the command instructs the modem not to use an uplink split mechanism.

Step 2105: The modem transmits data without using the uplink split policy.

The method for interaction between the application processor and the modem shown in FIG. 21 is also applied to a case in which the modem transmits the data by using a third transmission policy.

Figure 22:
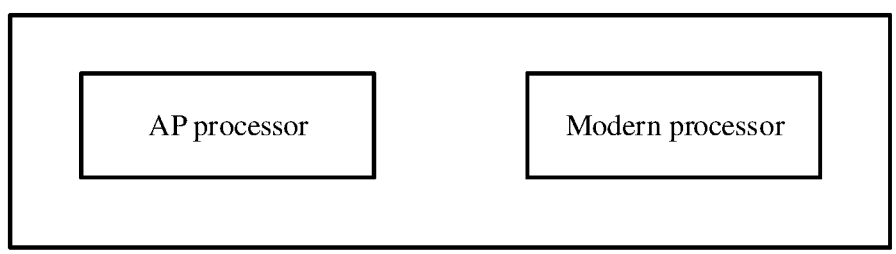
FIG. 22 is a schematic diagram of a chip according to an embodiment of this application.

An embodiment of this application further provides a chip system. As shown in FIG. 20, the chip system includes an application processor and a baseband processor (a modem). The system on chip 1000 shown in FIG. 22 includes the application processor (application processor, AP) 1002 and the baseband processor (baseband processor, BP) 1004. A full name of the application processor is multimedia application processor (multimedia application processor, MAP), which refers to a very large scale integrated circuit that extends audio and video functions and a dedicated interface based on a low power consumption central processing unit CPU. Application processors are mainly classified into three types, and may include a comprehensive processor, a multimedia processor, and a single media processor. The comprehensive processor not only needs to have a function of the multimedia application processor, but also can run a complex operating system such as Linux. The multimedia processor is a processor that processes more than two types of media, for example, media such as an image, voice, a video, and 3D graphics. The single multimedia processor is a processor that processes a medium, and is usually used only to process an image or voice.

The baseband processor is an important component in the system on chip, is equivalent to a protocol processor, is responsible for data processing and storage, and mainly includes units such as a digital signal processor (digital signal processor, DSP), a micro controller unit (micro controller unit, MCU), and a memory (such as a flash and a flash). Corresponding main functions of the baseband processor are responsible for baseband encoding or decoding, sound encoding, voice encoding, and the like. Currently, the baseband processor not only supports a plurality of communication standards (for example, GSM, LTE, and CDMA), but also provides a multimedia function and a communication interface related to a multimedia display, an image sensor, and an audio device.

During actual application, software that can be run by the application processor AP generally includes an operating system, a user interface, an application, and the like. The baseband processor BP may be considered as a wireless modem modem module, and is responsible for coordinating and controlling communication between the BP and a base station and between the BP and the AP. Software that can be run by the BP includes communication control software of a baseband modem baseband modem, and the like.

A preset interface technology can be for implementing mutual communication between the application processor AP and the baseband processor BP. The interface technology may be customized by a system. For example, the interface technology includes but is not limited to a serial peripheral interface (serial peripheral interface, SPI), a universal asynchronous receiver/transmitter (universal asynchronous receiver/transmitter, UART), a universal serial bus (universal serial bus, USB), a general-purpose input/output (general purpose input/output, GPIO) pin, and the like. Specifically, communication transmission between the application processor and the baseband processor may be implemented by using a control command in a message format, to implement functions such as a call, a short message service message, and mobile network access. The control command may include a conventional AT (attention) command, a mobile broadband interface model (mobile broadband interface model, MBIM) command, another protocol command supporting mutual transmission between the AP and the BP, or the like.

Optionally, the baseband processor BP shown in FIG. 20 can run protocol software related to a non-access stratum NAS and a radio resource control RRC layer. During actual application, the application processor AP supports communication with the NAS and the RRC layer in the baseband processor BP. For example, in this application, the application processor AP may send a corresponding signaling message to the NAS by using the conventional AT command, to notify the NAS of information such as an application status or a device screen status that is learned of by the AP currently.

During actual application, the system on chip 20 generally is a highly complex system on chip, for example, an SOC chip. During actual deployment, the system on chip may be deployed inside a device, or may be deployed outside the device, and the device is controlled by using a wired connection or a wireless connection. The device includes but is not limited to user equipment UE or a terminal device. For example, the device may specifically include a smartphone, a mobile internet device (mobile internet devices, MID), a wearable smart device, another device that supports network communication, or the like. Specifically, when the system on chip 1000 is deployed inside the user equipment, the system chip 20 is directly configured to implement the method according to any one of the method embodiments in FIG. 1 to FIG. 20. When the system on chip 1000 is deployed outside the user equipment, and communication between the system on chip 1000 and the user equipment can be established in a wired or wireless connection manner, the user equipment invokes or controls the system on chip 1000 to implement the method according to any one of the method embodiments in FIG. 1 to FIG. 20.

Figure 23:
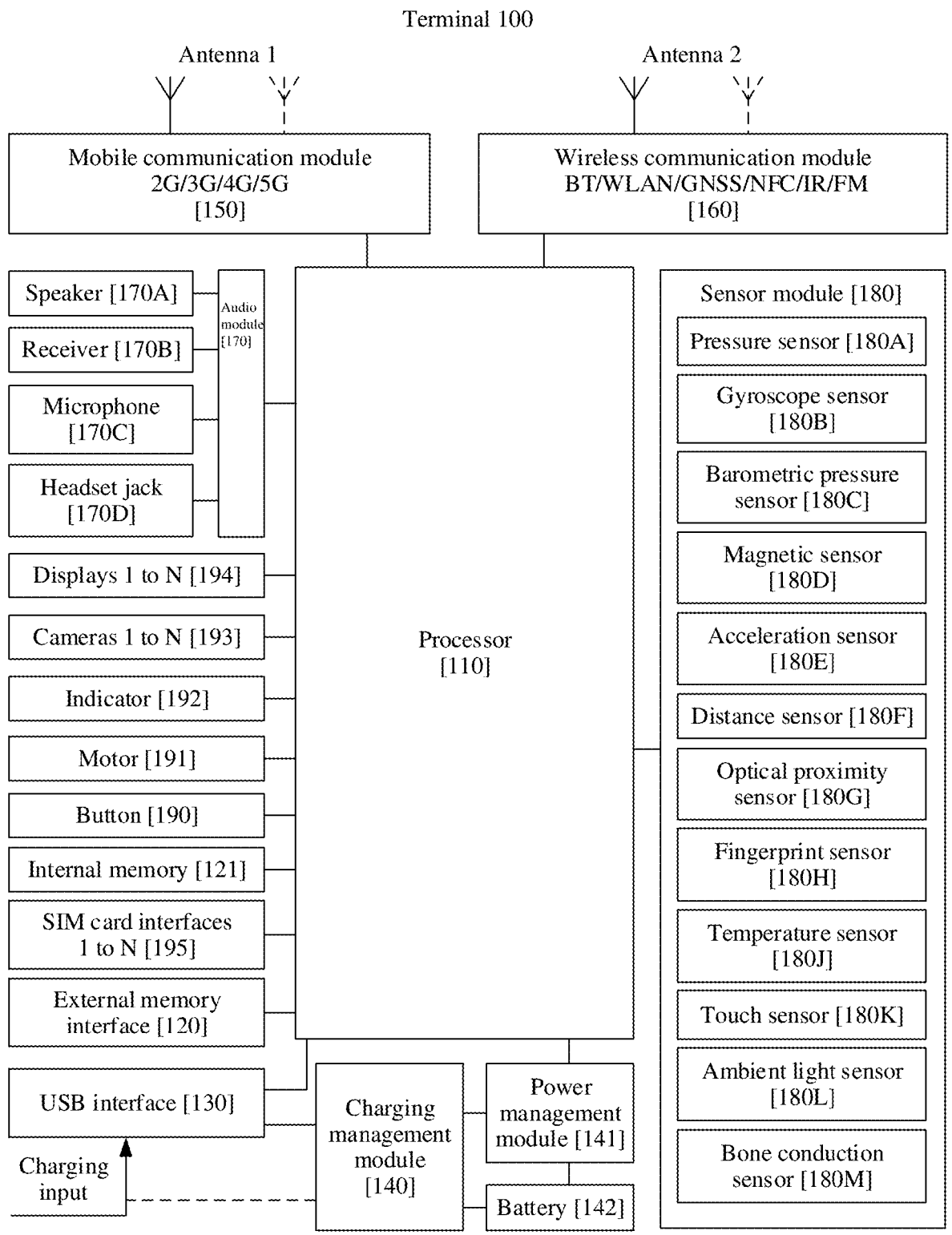
FIG. 23 is a schematic diagram of a terminal device according to an embodiment of this application.

FIG. 23 is a schematic diagram of a structure of a terminal 100.

The terminal wo is used as an example below to describe embodiments in detail. It should be understood that the terminal wo shown in FIG. 1A is merely an example, and the terminal wo may have more or fewer components than those shown in FIG. 1A, may combine two or more components, or may have different component configurations. Components shown in the figure may be implemented by hardware, software, or a combination of hardware and software that includes one or more signal processing and/or application-specific integrated circuits.

The terminal wo may include a processor no, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal wo may include more or fewer components than those shown in the figure, combine some components, split some components, or have different component arrangements. The components shown in the figure may be implemented by hardware, software, or a combination of the software and the hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal 100. The controller may generate an operation control signal based on an instruction operation code and a time sequence signal, to complete control of instruction reading and instruction execution.

A memory may be further disposed in the processor no, and is configured to store instructions and data. In some embodiments, the memory in the processor no is a cache memory. The memory may store an instruction or data that has just been used or is cyclically used by the processor no. If the processor no needs to use the instruction or the data again, the processor no may directly invoke the instruction or the data from the memory. This avoids repeated access, reduces waiting time of the processor no, and improves system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor no may include a plurality of groups of I2C buses. The processor no may be separately coupled to the touch sensor 180K, a charger, a flash, the camera 193, and the like through different I2C bus interfaces. For example, the processor no may be coupled to the touch sensor 180K through the I2C interface, so that the processor no communicates with the touch sensor 180K through the I2C bus interface, to implement a touch function of the terminal 100.

The I2S interface may be configured to perform audio communication. In some embodiments, the processor no may include a plurality of groups of I2S buses. The processor no may be coupled to the audio module 170 through the I2S bus, to implement communication between the processor no and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor no to the wireless communication module 160. For example, the processor no communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor no to a peripheral component such as the display 194 or the camera 193. The MIPI interface includes a camera serial interface (camera serial interface, CSI), a display serial interface (display serial interface, DSI), and the like. In some embodiments, the processor no communicates with the camera 193 through the CSI interface, to implement a photographing function of the terminal 100. The processor no communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor no to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB t e-C interface, or the like. The USB interface 130 may be configured to connect to a charger to charge the terminal 100, may be configured to transmit data between the terminal 100 and a peripheral device, or may be configured to connect to a headset for playing audio through the headset. The interface may be further configured to connect to another terminal such as an AR device.

It may be understood that an interface connection relationship between the modules in this embodiment of the present invention is merely an example for description, and does not constitute a limitation on the structure of the terminal 100. In some other embodiments of this application, the terminal 100 may alternatively use an interface connection manner different from that in the foregoing embodiment, or may use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the terminal 100. The charging management module 140 may further supply power to the terminal by using the power management module 141 while charging the battery 142.

The power management module 141 is configured to connect the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor no. In some other embodiments, the power management module 141 and the charging management module 140 may alternatively be disposed in a same device.

A wireless communication function of the terminal 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the terminal 100, to wireless communication including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to a modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor no. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution, applied to the terminal 100, to wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The terminal 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the terminal 100 may include one or N displays 194, where N is a positive integer greater than 1.

The terminal 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. A photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 may play or record videos in a plurality of coding formats, for example, moving picture experts group (moving picture experts group, MPEG) 1, MPEG 2, MPEG 3, and MPEG 4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the terminal 100, such as image recognition, facial recognition, speech recognition, and text understanding.

The external memory interface 120 may be configured to connect to an external memory card, for example, a micro SD card, to extend a storage capability of the terminal 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor no runs the instructions stored in the internal memory 121, to implement various function applications and data processing of the terminal 100. The internal memory 121 may include a program storage area and a data storage area. The program storage area may store an operating system, an application required by at least one function (for example, a voice playing function or an image playing function), and the like. The data storage area may store data (for example, audio data and a phone book) and the like created when the terminal 100 is used. In addition, the internal memory 121 may include a high-speed random access memory, or may include a nonvolatile memory, for example, at least one magnetic disk storage device, a flash memory, or a universal flash storage (universal flash storage, UFS).

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor no, or some functional modules in the audio module 170 are disposed in the processor no.

The speaker 170A, also referred to as a "loudspeaker", is configured to convert an electrical audio signal into a sound signal. The terminal 100 may listen to music or answer a call in a hands-free mode by using the speaker 170A.

The receiver 170B, also referred to as an "earpiece", is configured to convert an electrical audio signal into a sound signal. When a call is answered or a voice message is listened to by using the terminal 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal wo may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a short message service message application icon, an instruction for viewing a short message service message is executed. When a touch operation whose touch operation intensity is greater than or equal to a first pressure threshold is performed on a short message service message application icon, an instruction for creating a short message service message is executed.

The gyro sensor 180B may be configured to determine a moving posture of the terminal wo. In some embodiments, angular velocities of the terminal wo around three axes (namely, x, y, and z axes) may be determined by using the gyro sensor 180B. The gyro sensor 180B may be configured to implement image stabilization during photographing. For example, when the shutter is opened, the gyro sensor 180B detects an angle at which the terminal wo jitters, calculates, based on the angle, a distance for which a lens module needs to compensate, and allows the lens to cancel the jitter of the terminal wo through reverse motion, to implement image stabilization. The gyro sensor 180B may also be used in a navigation scenario and a somatic game scenario.

The barometric pressure sensor 180C is configured to measure barometric pressure. In some embodiments, the terminal wo calculates an altitude by using a barometric pressure value measured by the barometric pressure sensor 180C, to assist positioning and navigation.

The magnetic sensor 180D includes a Hall sensor. The terminal wo may detect opening and closing of a flip leather case by using the magnetic sensor 180D. In some embodiments, when the terminal wo is a clamshell phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect values of accelerations of the terminal 100 in various directions (usually on three axes). When the terminal 100 is still, a value and a direction of gravity may be detected. The acceleration sensor 180E may further be configured to recognize a posture of a terminal, and is applied in an application such as a pedometer or screen switching between a landscape mode and a portrait mode.

The distance sensor 180F is configured to measure a distance. The terminal 100 may measure a distance through infrared light or a laser. In some embodiments, the terminal 100 may use the distance sensor 180F to measure a distance, to implement fast focusing in a photographing scenario.

The optical proximity sensor 180G may include, for example, a light emitting diode (LED) and an optical detector, for example, a photodiode. The light emitting diode may be an infrared light emitting diode. The terminal 100 emits infrared light by using the light emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The terminal wo may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the terminal wo is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal wo executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal wo heats the battery 142 to prevent the terminal wo from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a touch panel. The touch sensor 180K may be disposed on the display 194, and a touchscreen includes the touch sensor 180K and the display 194. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the terminal wo in a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a key input, and generate a key signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 simultaneously. The plurality of cards may be of a same type or different types. The SIM card interface 195 is also compatible with different types of SIM cards. The SIM card interface 195 is also compatible with an external storage card. The terminal 100 interacts with a network through the SIM card, to implement functions such as calling and data communication. In some embodiments, the terminal 100 uses an eSIM, namely, an embedded SIM card. The eSIM card may be embedded in the terminal 100, and cannot be separated from the terminal 100.

The terminal 100 may further include a magnetometer (not shown in the figure), which may also be referred to as an electronic compass or a compass, and may be configured to detect intensity and a direction of a magnetic field.

With descriptions of the foregoing implementations, a person skilled in the art may clearly understand that this application may be implemented by using hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another optical disc storage, disk storage medium or another magnetic storage device, or any other medium that can carry or store expected program code in a form of instructions or a data structure and can be accessed by a computer. In addition, any connection may be properly defined as a computer-readable medium. For example, if software is transmitted from a website, a server or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination shall also be included in the protection scope of the computer-readable medium.

In summary, the foregoing descriptions are merely embodiments of the technical solutions of this application, but is not intended to limit the protection scope of this application. Any modification, equivalent replacement, or improvement made according to the disclosure of this application shall fall within the protection scope of this application.

What is claimed is:

1. A method, comprising:
   running, by a terminal device connected to a 4G network device through an LTE link and a 5G network device through an NR link, a first application in response to a first operation of a user on the terminal device;
   when the terminal device determines that an identifier corresponding to the first application is included in a list of preset application identifiers, determining, by the terminal device, that the first application is a preset application, and based on a determination, by the terminal device, that the first application is a preset application:
      determining, by the terminal device, based on a packet type of a first data packet to be sent by the terminal device, that the first data packet is a preset data packet, and
      respectively sending, by the terminal device, the first data packet and a second data packet through the LTE link and the NR link, wherein the second data packet is a duplicated packet of the first data packet; and
   when the terminal device determines that the identifier corresponding to the first application is not included in the list of preset application identifiers, determining, by the terminal device, that the first application is not a preset application, and based on a determination, by the terminal device, that the first application is not a preset application and a size of the first data packet is below a predetermined split threshold, transmitting the first data packet through the LTE link, or, when the size of the first data packet is above the predetermined split threshold, transmitting the first data packet through the NR link.

2. The method according to claim 1, wherein the method further comprises:
   running, by the terminal device, a second application in response to a second operation of the user on the terminal device; and
   sending, by the terminal device, a third data packet of the second application through the NR link, wherein the second application is a non-preset application, or the third data packet is a data packet of a non-preset type.

3. The method according to claim 1, wherein the packet type of the first data packet comprises at least one of following: a game data packet, a voice data packet, a domain name system (DNS) data packet, a video data packet, or a user datagram protocol (UDP) data packet.

4. The method according to claim 1, wherein the predetermined split threshold is set to a level that split transmission is not performed on a data packet.

5. The method according to claim 1, wherein the method further comprises:
   determining, by the terminal device, a name of the first application using a universally unique identifier (UUID) or a process ID (PID), wherein the name of the first application corresponds to the identifier corresponding to the first application.

6. A terminal device, comprising:
   at least one processor, and a non-transitory computer storage medium storing instructions, wherein when the at least one processor executes the instructions, the terminal device is cause to perform:
   connecting to a 4G network device through an LTE link, and connecting to a 5G network device through an NR link;
   running, with the terminal device connected to a 4G network device through the LTE link and the 5G network device through the NR link, a first application in response to a first operation of a user on the terminal device;
   when the terminal device determines that an identifier corresponding to the first application is included in a list of preset application identifiers, determining, by the terminal device, that the first application is a preset application, and based on a determination, by the terminal device, that the first application is a preset application:
      determining, by the terminal device, based on a packet packet type of a first data packet to be sent by the terminal device, that the first data packet is a preset data packet, and
      respectively sending, by the terminal device, the first data packet and a second data packet through the LTE link and the NR link, wherein the second data packet is a duplicated packet of the first data packet; and
   when the terminal device determines that the identifier corresponding to the first application is not included in the list of preset application identifiers, determining, by the terminal device, that the first application is not a preset application, and based on a determination, by the terminal device, that the first application is not a preset application and a size of the first data packet is below a predetermined split threshold, transmitting the first data packet through the LTE link, or, when the size of the first data packet is above the predetermined split threshold, transmitting the first data packet through the NR link.

7. The terminal device according to claim 6, wherein the terminal device is further caused to perform:
   running a second application in response to a second operation of the user on the terminal device; and
   sending a third data packet of the second application through the NR link, wherein the second application is a non-preset application, or the third data packet is a data packet of a non-preset type.

8. The terminal device according to claim 6, wherein the packet type of the first data packet comprises at least one of the following: a game data packet, a voice data packet, a domain name system (DNS) data packet, a video data packet, or a user datagram protocol (UDP) data packet.

9. The terminal device according to claim 6, wherein the predetermined split threshold is set to a level that split transmission is not performed on a data packet.

10. The terminal device according to claim 6, wherein the terminal device is further caused to perform:
- determining a name of the first application using a universally unique identifier (UUID) or a process ID (PID), wherein the name of the first application corresponds to the identifier corresponding to the first application.

11. A non-transitory computer-readable medium (CRM), wherein the CRM stores computer instructions, and when the computer instructions are run on a terminal device connected to a 4G network device through an LTE link and a 5G network device through an NR link, the terminal device is enabled to perform:
- running a first application in response to a first operation of a user on the terminal device;
- when the terminal device determines that an identifier corresponding to the first application is included in a list of preset application identifiers, determining, by the terminal device, that the first application is a preset application, and based on a determination, by the terminal device, that the first application is a preset application:
  - determining, by the terminal device, based on a packet type of a first data packet to be sent by the terminal device, that the first data packet is a preset data packet, and
  - respectively sending, by the terminal device, the first data packet and a second data packet through the LTE link and the NR link, wherein the second data packet is a duplicated packet of the first data packet; and
- when the terminal device determines that the identifier corresponding to the first application is not included in the list of preset application identifiers, determining, by the terminal device, that the first application is not a preset application, and based on a determination, by the terminal device, that the first application is not a preset application and a size of the first data packet is below a predetermined split threshold, transmitting the first data packet through the LTE link, or, when the size of the first data packet is above the predetermined split threshold, transmitting the first data packet through the NR link.

12. The CRM according to claim 11, wherein the computer instructions further enable the terminal device to perform:
- running a second application in response to a second operation of the user on the terminal device; and
- sending a third data packet of the second application through the NR link, wherein the second application is a non-preset application, or the third data packet is a data packet of a non-preset type.

13. The CRM according to claim 11, wherein the packet type of the first data packet comprises at least one of following: a game data packet, a voice data packet, a domain name system (DNS) data packet, a video data packet, or a user datagram protocol (UDP) data packet.

14. The CRM according to claim 11, wherein the predetermined split threshold is set to a level that split transmission is not performed on a data packet.

15. The method according to claim 1, wherein when a delay of the NR link is less than that of the LTE link, and the first data packet is the preset data packet, the terminal device sends the first data packet through the NR link.

16. The terminal device according to claim 6, wherein when a delay of the NR link is less than that of the LTE link, and the first data packet is the preset data packet, the terminal device sends the first data packet through the NR link.

17. The CRM according to claim 11, wherein when a delay of the NR link is less than that of the LTE link, and the first data packet is the preset data packet, the terminal device sends the first data packet through the NR link.

\* \* \* \* \*